(12) United States Patent
Taguchi et al.

(10) Patent No.: US 7,147,680 B2
(45) Date of Patent: Dec. 12, 2006

(54) HYDROGEN PURIFICATION APPARATUS AND METHOD AND FUEL CELL POWER GENERATION SYSTEM AND METHOD

(75) Inventors: Kiyoshi Taguchi, Osaka (JP); Kunihiro Ukai, Ikoma (JP); Seiji Fujiwara, Osaka (JP); Takeshi Tomizawa, Ikoma (JP); Hidenobu Wakita, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 469 days.

(21) Appl. No.: 10/239,965

(22) PCT Filed: Jan. 24, 2002

(86) PCT No.: PCT/JP02/00487

§ 371 (c)(1),
(2), (4) Date: Mar. 17, 2003

(87) PCT Pub. No.: WO02/059038

PCT Pub. Date: Aug. 1, 2002

(65) Prior Publication Data

US 2003/0175562 A1    Sep. 18, 2003

(30) Foreign Application Priority Data

| | | |
|---|---|---|
| Jan. 26, 2001 | (JP) | 2001-018997 |
| May 24, 2001 | (JP) | 2001-156069 |
| Jun. 12, 2001 | (JP) | 2001-176571 |
| Jun. 19, 2001 | (JP) | 2001-184479 |

(51) Int. Cl.
*C01B 3/24* (2006.01)
*B01J 8/00* (2006.01)

(52) U.S. Cl. ............ 48/61; 48/127.9; 48/128; 422/170; 422/171; 502/300; 502/304; 502/325; 502/339; 502/349

(58) Field of Classification Search ............ 48/61, 48/127, 128, 197 R–199, 127.9; 422/129, 422/180, 188–190, 170, 171; 423/650–658; 502/64–79, 313–325, 300, 304, 339, 349
See application file for complete search history.

(56) References Cited

U.S. PATENT DOCUMENTS 5,236,692 A * 8/1993 Nagashima et al. ........ 423/584

(Continued)

FOREIGN PATENT DOCUMENTS

EP    1046612    10/2000

(Continued)

OTHER PUBLICATIONS

Japanese International Search Report for PCT/JP02/00487, dated Apr. 23, 2002.

(Continued)

*Primary Examiner*—N. Bhat
(74) *Attorney, Agent, or Firm*—RatnerPrestia

(57) ABSTRACT

Conventional hydrogen purification apparatuses cannot be used satisfactorily for applications in which much time is required for startup of the apparatus, and the apparatus is repeatedly started and stopped at frequent intervals because of complicated handling. In a hydrogen purification apparatus comprising at least a catalysis body removing carbon monoxide from a reformed gas containing hydrogen, carbon monoxide and steam, the catalyst body is constituted by a carrier comprised of a complex oxide in which at least one of Mo, W and Re is compounded with Zr, or comprised of an oxide of one of Mo, W, Re and Zr, and at least one of Pt, Pd, Rh and Ru carried on the surface of the carrier.

3 Claims, 5 Drawing Sheets

U.S. PATENT DOCUMENTS

| | | | |
|---|---|---|---|
| 5,830,425 | A | 11/1998 | Schneider et al. |
| 6,524,550 | B1 * | 2/2003 | Chintawar et al. ........... 423/650 |
| 6,531,106 | B1 * | 3/2003 | Nojima et al. .............. 423/247 |
| 6,733,552 | B1 * | 5/2004 | Taguchi et al. ............ 48/127.9 |
| 6,846,475 | B1 * | 1/2005 | Taguchi et al. ............. 423/656 |
| 6,972,119 | B1 * | 12/2005 | Taguchi et al. ............. 422/188 |
| 2003/0186804 | A1 * | 10/2003 | Wagner et al. .............. 502/300 |
| 2004/0037757 | A1 * | 2/2004 | Taguchi et al. ............. 422/188 |
| 2004/0147394 | A1 * | 7/2004 | Wagner et al. .............. 502/325 |

FOREIGN PATENT DOCUMENTS

| | | | |
|---|---|---|---|
| EP | 1161991 | * | 10/2000 |
| EP | 1136441 | | 9/2001 |
| EP | 1136442 | | 9/2001 |
| EP | 001046612 | A1 * | 12/2001 |
| GB | 0002791 | A1 * | 7/1979 |
| JP | 58-32001 | | 2/1983 |
| JP | 07-506051 | | 7/1995 |
| JP | 2000-178007 | | 6/2000 |
| JP | 2000-302410 | | 10/2000 |
| JP | 2000-342968 | * | 12/2000 |
| JP | 3215680 | | 7/2001 |
| JP | 2001-316682 | | 11/2001 |
| JP | 2001-322803 | | 11/2001 |
| JP | 2002-56874 | | 2/2002 |
| JP | 2002-79102 | | 3/2002 |
| WO | WO 00/48261 | | 8/2000 |
| WO | WO 00/54879 | | 9/2000 |

OTHER PUBLICATIONS

English translation of Japanese International Search Report for PCT/JP02/00487, dated Apr. 23, 2002.

Utaka, et al., "CO removal by oxygen-assisted water gas shift reaction over supported Cu catalysts", Applied Catalysis A: General 2000, vol. 194 to 195, pp. 21-26.

* cited by examiner

HYDROGEN PURIFICATION APPARATUS AND METHOD AND FUEL CELL POWER GENERATION SYSTEM AND METHOD

This application is a U.S. National Phase Application of PCT International Application PCT/JP2002/00487.

TECHNICAL FIELD

The present invention relates to a hydrogen purification apparatus and method of purifying a reformed gas containing hydrogen as a main component and containing carbon monoxide (hereinafter referred to as CO) to provide high-purity hydrogen gas. Also, the present invention relates to a hydrogen feeder for a polymer electrolyte fuel cell or the like using hydrogen as a fuel.

BACKGROUND ART

The fuel cell cogeneration system of high power generation efficiency and high overall efficiency is given attention as a distributed power plant using energy effectively.

Many of fuel cells, for example, commercially practical phosphoric fuel cells and polymer electrolyte fuel cells being under development generate power using hydrogen as a fuel. However, hydrogen is not secured as an infrastructure, and thus needs to be produced at a site where the system is placed.

One method of producing hydrogen is a steam reforming method. A reformed gas obtained by mixing a raw material such as a hydrocarbon based material such as natural gas, LPG, naphtha, gasoline or kerosene, an alcohol based material such as methanol, and ether with water, and by subjecting the mixture to a steam reforming reaction in a reforming unit provided with a reforming catalyst is used as a hydrogen source such as in a fuel cell. In the case of the polymer electrolyte fuel cell operating at a low temperature of 100° C. or lower, however, the Pt catalyst for use in the electrode of the fuel cell may be rendered poisonous by CO contained in the reformed gas. If the Pt catalyst is rendered poisonous, the reaction of hydrogen is hindered, and thus power generation efficiency of the fuel cell is significantly reduced. For this reason, CO should be removed to reduce the concentration of CO to 100 ppm or smaller, preferably 10 ppm or smaller, using the hydrogen purification apparatus.

In this steam reforming reaction, carbon monoxide is produced as a by-product, but because the carbon monoxide deteriorates the fuel cell electrode catalyst, the carbon monoxide should be removed to reduce its concentration to 100 ppm or smaller, preferably 10 ppm or smaller especially for the polymer electrolyte fuel cell.

Usually, for removing CO, CO and steam are made to undergo a shift reaction to convert them into carbon dioxide and hydrogen in a CO shifting unit with a CO shifting catalyst body placed after the reforming unit in the hydrogen purification apparatus, thereby reducing the concentration of CO to the level of several thousand ppm to 1% by volume.

Thereafter, oxygen is added thereto using a very small amount of air, and CO is removed by a CO selection oxide catalyst body to reduce the concentration of CO to the level of several ppm at which the fuel cell is no longer adversely affected. Here, the amount of oxygen to be added should be one to three times as much as the CO concentration for sufficiently removing CO, but at this time, hydrogen is also consumed in response to the amount of oxygen to be added. If the concentration of CO at the outlet of the shifting unit is high, the amount of oxygen to be added is also increased, and the amount of consumed hydrogen is increased, thus significantly reducing efficiency of the overall apparatus.

Therefore, it is necessary to reduce CO sufficiently in the CO shifting unit with the CO shifting catalyst body placed therein.

Traditionally, for the CO shifting catalyst, copper-zinc based catalysts, copper-chrome based catalysts and the like capable of being used at 150 to 300° C. are used as low temperature CO shifting catalysts, and iron-chrome based catalysts and the like functioning at 300° C. or higher are used as high temperature CO shifting catalysts. For these CO shifting catalysts, only the low temperature CO shifting catalyst was used, or the high temperature CO shifting catalyst and low temperature CO shifting catalyst were used in combination depending on the uses of chemical plants and hydrogen generators for fuel cells.

However, when the copper based low temperature CO shifting catalyst is used as a main catalyst, a very high catalytic activity is obtained, but the catalyst needs to be activated by carrying out reduction treatment before it is used. Further, because the catalyst generates heat during the activation treatment, it was required to treat the catalyst for a long time while adjusting the amount of supplied reducing gas, for example, in order to prevent the situation in which the temperature of the catalyst is increased to above its heat-resistant temperature. Also, because the once activated CO shifting catalyst may be reoxidized and deteriorated if oxygen is entrained at the time when the apparatus is stopped and so on, it required some measures for prevention of oxidation and so on. In addition, the low temperature CO shifting catalyst has poor heat resistance, and thus cannot be heated rapidly at the time of starting the apparatus, and therefore it required some measures of increasing temperature slowly and so on.

On the other hand, in the case where only the high temperature CO shifting catalyst is used, the situation in which the temperature rises to somewhat excessive level can be accepted because of high heat resistance, and therefore heating during startup or the like is easier.

However, the CO shift reaction is an equilibrium reaction that hardly proceeds toward reduction in CO concentration in the high temperature region, and it was difficult to reduce the CO concentration to 1% by volume or smaller when a high temperature CO shifting catalyst functioning only at high temperature was used. Therefore, there were cases where purification efficiency in a CO purification unit connected subsequently was reduced.

In this way, in conventional techniques, there have been problems in which they cannot be applied well to the application where the hydrogen purification apparatus is frequently started and stopped because it takes much time to start the apparatus, and because of complicated handling.

Also, as described in Japanese Patent Laid-Open No. 2000-178007, use of precious metal based catalysts not requiring reduction treatments has been proposed. The precious based catalyst is used at about 250 to 350° C., but in the high temperature region, not only carbon monoxide is reduced by the shift reaction, but also a reaction tends to occur in which carbon monoxide and hydrogen in the reformed gas is reacted with each other to produce methane as a by-product, and thus there have been cases where the efficiency of the apparatus is reduced.

DISCLOSURE OF THE INVENTION

In view of the above problems of conventional techniques, the present invention has as its object provision of a hydrogen purification apparatus and method enabling heating during startup and the like to be carried out smoothly, and having high CO purification efficiency, for example.

Also, in view of the problems of conventional techniques, the present invention has as its object provision of a hydrogen purification apparatus and method enabling heating during startup and the like to be carried out smoothly, and preventing methanation to improve efficiency of the apparatus, for example.

One aspect of the present invention is a hydrogen purification apparatus comprising a carbon monoxide shifting catalyst body removing carbon monoxide from a reformed gas containing hydrogen, carbon monoxide and steam, wherein said carbon monoxide shifting catalyst body contains a metal oxide containing at least one element selected from Fe, Cr, Ce, Mo, W, Re and Cu, and at least one precious metal of Pt, Pd, Rh and Ru.

Another aspect of the present invention is the hydrogen purification apparatus, wherein said carbon monoxide shifting catalyst body contains:

(1) a complex oxide in which at least one element selected from Fe, Cr, Ce, Mo, W, Re and Cu is compounded with other elements; and (2) at least one precious metal of Pt, Pd, Rh and Ru.

Still another aspect of the present invention is the hydrogen purification apparatus, wherein said complex oxide has Zr compounded with at least one of Mo, W and Re, and the content of Mo, W or Re is larger in percent by atom than the content of precious atom contained in said carbon monoxide shifting catalyst body.

Yet still another aspect of the present invention is the hydrogen purification apparatus, wherein said complex oxide forms a solid solution.

Still yet another aspect of the present invention is the hydrogen purification apparatus, wherein said carbon monoxide shifting catalyst body has (1) at least one type of element selected from Fe, Cr, Ce, Re, Mo, W and Cu ion-exchanged or carried on zeolite, and (2) at least one precious metal of Pt, Pd, Rh and Ru ion-exchanged or carried on zeolite.

A further aspect of the present invention is the hydrogen purification apparatus, wherein said carbon monoxide shifting catalyst body contains said metal oxide or said complex oxide, and at least one precious metal of Pt, Pd, Rh and Ru, and has zeolite mixed therewith.

A still further aspect of the present invention is the hydrogen purification apparatus, wherein said zeolite has silica and alumina as main components, and the ratio of $SiO_2/Al_2O_3$ is 4 or greater.

A yet further aspect of the present invention is the hydrogen purification apparatus, wherein said zeolite is one type selected from Y-type, L-type, mordenite type, ZSM-5 type and beta type structures.

A still yet further aspect of the present invention is the hydrogen purification apparatus, wherein said complex oxide is constituted by Fe and Cr, Fe and Ni, or Fe and Cr and Ni.

An additional aspect of the present invention is the hydrogen purification apparatus, wherein said metal oxide is an iron oxide, and the particle size of said metal oxide is in the range of from 10 nm to 1 μm.

A still additional aspect of the present invention is the hydrogen purification apparatus, wherein said metal oxide is an iron oxide, and is constituted by at least one of $Fe_2O_3$ and $Fe_3O_4$.

A yet additional aspect of the present invention is the hydrogen purification apparatus, wherein said iron oxide has magnetism.

A still yet additional aspect of the present invention is a fuel cell power generation system wherein said carbon monoxide shifting a catalyst body is used.

Figure 1:
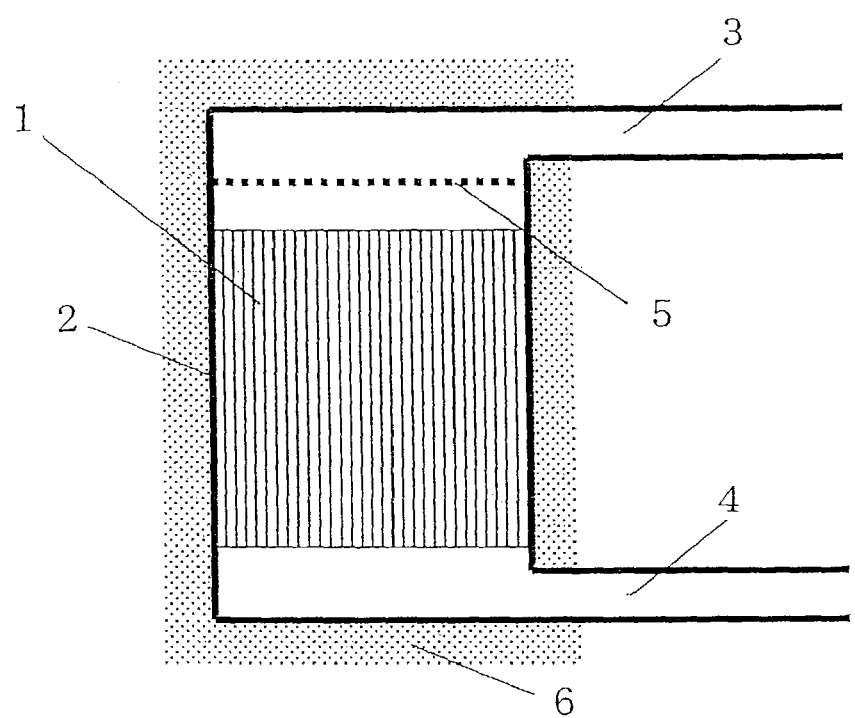
FIG. 1 is a schematic longitudinal sectional view showing the configuration of a hydrogen generator including a hydrogen purification apparatus according to Embodiments 1, 3 and 5 of the present invention.

| (Description of Symbols) |
| --- |
| 1 Catalyst body |
| 2 Reaction chamber |
| 3, 15 Reformed gas inlet |
| 4, 16 Reformed gas outlet |
| 5, 17 Diffuser panel |
| 6, 18 Heat insulator |
| 11 First catalyst body |
| 12 First reaction chamber |
| 13 Second catalyst body |
| 14 Second reaction chamber |
| 19 Cooling fan |

MODE FOR CARRYING OUT THE INVENTION

Embodiments according to the present invention will be described below referring to the drawings.

EMBODIMENT 1

First, the configuration of the hydrogen purification apparatus in this embodiment will be described referring to FIG. 1. Furthermore, FIG. 1 is a schematic longitudinal sectional view showing the configuration of the hydrogen purification apparatus in this embodiment.

In FIG. 1, reference numeral 1 denotes a CO shifting catalyst body (hereinafter also referred to simply as catalyst body), which has been placed inside a reaction chamber 2. Reference numeral 3 denotes a reformed gas inlet, from which the reformed gas is introduced. The reformed gas reacted in the CO shifting catalyst body 1 is discharged from a reformed gas outlet 4.

Furthermore, a diffuser panel 5 is placed in the upstream of the catalyst body 1 so that the reformed gas is flown uniformly. Also, for keeping the reaction chamber 2 at a fixed temperature, the periphery of some spaces was covered with a heat insulator 6 made of ceramic wool as required.

Here, for the catalyst body 1, a material having a cogierite honeycomb coated with a catalyst with Pt carried on a complex oxide of zirconium (hereinafter referred to as Zr) and molybdenum (hereinafter referred to as Mo) was used.

Operations of the hydrogen purification apparatus in this embodiment will now be described.

Fuels used for producing the reformed gas to be supplied to the hydrogen purification apparatus include natural gas, methanol and gasoline, and reforming methods include steam reforming in which steam is added, and partial reforming in which air is added to carry out reforming, but in this case, the case will be described where natural gas is subjected to steam reforming to obtain the reformed gas.

The composition of the reformed gas when natural gas is subjected to steam reforming more or less varies depending on the temperature of the reforming catalyst body, but the average value excluding steam is such that the content of hydrogen is about 80% by volume, and the contents of carbon dioxide and carbon monoxide are about 10% by volume, respectively.

Since the reforming reaction for natural gas is carried out at 500 to 800° C. while the shift reaction in which CO and steam are reacted with each other proceeds at 150 to 350° C., the reformed gas is supplied after being cooled just before the reformed gas inlet 3. The concentration of CO after the CO shifting catalyst body 1 is passed is reduced to about 0.5% by volume, and the CO is discharged from the reformed gas outlet 4.

The operating principle of the hydrogen purification apparatus of this embodiment will now be described.

The CO shift reaction is an equilibrium reaction dependent on temperature, and the concentration of CO can be reduced as the temperature at which the reaction is carried out is decreased. On the other hand, when the temperature is decreased, the reaction on the catalyst is slowed. Therefore, there is a temperature at which the concentration of CO takes a minimum value.

Copper based shifting catalysts such as a copper-zinc catalyst and a copper-chrome catalyst that are used as CO shifting catalysts in the conventional hydrogen purification apparatus can undergo the CO shift reaction at a low temperature of 150 to 250° C., and the concentration of CO can be reduced to about several hundreds to one thousand ppm depending on conditions.

However, the copper based catalyst needs to be activated by circulating reducing gas such as hydrogen and reformed gas during startup of the apparatus after the reaction vessel is filled with the catalyst, and its heat-resistant temperature is as low as about 300° C. Therefore, the reducing gas should be diluted with an inert gas or the like before being supplied, or the reaction should be carried out slowly at a low flow rate in order to prevent the situation in which temperature is increased to above the heat-resistant temperature due to the heat of reaction at the time of activation, and thus it takes much time to carry out the reaction. Also, at the time of starting the apparatus, heating should be carried out slowly for a long time in order to prevent the situation in which temperature is increased excessively to exceed the heat-resistant temperature, and thus the copper based catalyst has a lot of problems for applications where the apparatus is started and stopped frequently.

On the other hand, in the hydrogen purification apparatus of this embodiment, a precious metal catalyst Pt is used for part of the catalyst body 1, and the catalyst has very high heat resistance compared to the copper based catalyst, thus eliminating the possibility that the catalyst is significantly deteriorated even if the temperature rises to as high as about 500° C. at the time of starting the apparatus. Also, unlike the copper based catalyst, it is not necessary to carry out long hours of reduction treatment. Also, even if air is entrained when the apparatus is stopped, the catalyst is less significantly deteriorated than the copper based catalyst.

Also, precious metal catalysts having Pt, Pd, Rh, Ru and the like as active components have relatively low reaction selectivity because of high activity. Therefore, the methanation reaction of CO or carbon dioxide may also proceed as a secondary reaction of the CO shift reaction depending on conditions, and thus there is apprehension that consumption of hydrogen due to the proceeding methanation reaction reduces efficiency of the entire apparatus.

However, usually, the methanation reaction becomes active as the temperature is increased in the temperature range of from 150 to 450° C. at which the CO shift reaction is carried out, but the production rate of methane also varies depending on the type of precious metals. This is because the CO absorption mechanism varies depending on the type of precious metals, and Pd, Rh and Ru having CO absorption mechanisms allowing the methanation reaction to proceed easily cause methane to be produced at relatively low temperature, thus narrowing the range of temperature at which the CO shift reaction can be carried out. On the other hand, the Pt catalyst for use in this embodiment does not cause the methanation reaction easily, and thus allows the CO shift reaction to be carried out in the wide range of temperature. Therefore, there is no possibility that a large amount of hydrogen is consumed due to the proceeding methanation reaction, and thus the hydrogen purification apparatus of this embodiment can be operated efficiently.

Also, by adding Mo as a promoter, the activity of the Pt catalyst for the CO shift reaction is improved, and the methanation reaction can be curbed. This is due to the effect of changing the state of the oxidized Pt catalyst into a state in which the shift reaction proceeds more easily.

Also, the amount of Mo to be added is preferably equal to or larger than the amount of carried Pt. The catalytic activity becomes higher as the amount of carried Pt is increased, but the effect of increasing the amount of Pt cannot be exerted unless the amount of Mo is equal to or larger than the amount of Pt.

However, molybdenum oxide has low heat resistance compared to carriers such as zirconia, and may have its specific surface area decreased to reduce the catalytic activity when used under conditions causing the temperature to rise to above 600° C. Also, it is slightly water soluble, thus raising a possibility that Mo is leaked in the long run.

In the case of the hydrogen purification apparatus of the present invention, a complex oxide with Mo compounded with Zr, for example, is used as a catalyst carrier, and thus stability of the catalyst carrier is improved, and it is unlikely that the catalysts activity will be reduced. For the ratio between Mo and Zr, heat resistance is improved to add stability as the content of Mo decreases (namely, the content of Zr increases), but the methanation reaction in the high temperature range proceeds more easily as the content of Mo decreases. Therefore, the content of Mo is preferably 1% by atom or larger, based on the atomic ratio of the amount of Mo to the total amount of Mo and Zr in the complex oxide and expressed as a %. However, if the content of Mo is larger than 90% by atom, based on the atomic ratio of the amount of Mo to the total amount of Mo and Zr in the complex oxide and expressed as %, the performance obtained will be limited to the level almost identical to that of molybdenum oxide.

That is, for the hydrogen purification apparatus of the present invention, the above described carrier is comprised of a complex oxide with Zr compounded with at least one of Mo, W and Re, and an effect similar to that described above can be obtained even if the total content of Mo, W, and Re in the complex oxide is 1 to 90% by atom, based on the atomic ratio of (1) the total amount of Mo, W, and Re to (2) the total amount of Mo, W, Re, and Zr in the complex oxide and expressed as a %.

Furthermore, the method of compounding Zr with Mo is not particularly limited, and for example, the coprecipitation process, the sol-gel process, the alkoxide method and the like may be used. Also, zirconia may be impregnated with a solution of Mo salt.

Also, in the case where molybdenum oxide and zirconia are compounded together uniformly in such a manner as to form a solid solution, stability of the carrier is improved, and proceeding of the methanation reaction is curbed. This is because properties of low resistance and tendencies to cause methanation reaction specific of respective materials emerge when molybdenum oxide and zirconia are present without forming a solid solution. The formed solid solution can be observed by powder X-ray diffraction measurement, and it can be understood that the lower the single phase diffraction ray intensity of molybdenum oxide and zirconia, the more uniformly the solid solution is formed.

It is necessary to reduce the size of Pt particles and increase the number of active sites to obtain sufficient catalytic activity, and for this purpose, it is preferable that Pt is carried on a metal oxide having a BET specific surface area of 10 square meters per unit or larger. Here, the BET specific surface area refers to a specific surface area determined by a well known measuring method in which nitrogen is absorbed in powders to carry out measurements.

The upper limit of the BET specific surface area is not specified, and similarly high activity can be obtained even in the case of 100 to 200 square meters per gram, but if the BET specific surface area is equal to or larger than 100 square meters per gram, the effect of increased specific surface area is diminished. If the BET specific surface area of the metal oxide and complex metal oxide is smaller than 10 square meters per gram, Pt is not sufficiently adsorbed and the degree of dispersion of Pt is reduced, thus making it impossible to obtain sufficient catalytic activity. Furthermore, because the particle size of Pt is reduced, the number of active sites decreases, and thus sufficient activity cannot be obtained if the amount of carried Pt is reduced.

Also, in this embodiment, the complex oxide with Mo compounded with Zr is used, but a similar effect can be obtained even if tungsten (W) and rhenium (Re) are compounded in place of Mo. These elements have chemical properties similar to those of Mo, and therefore the effect of adding these elements is same as the effect of adding Mo. Also, a similar effect can be obtained even if these additive elements are used in combination.

Also, in this embodiment, the catalyst body has a shape of cogierite honeycomb, but a shifting catalyst body having a similar capability can be obtained even if the carrier is of pellet type, and it is impregnated with salt of Pt to prepare a CO shifting catalyst body.

EMBODIMENT 2

Figure 2:
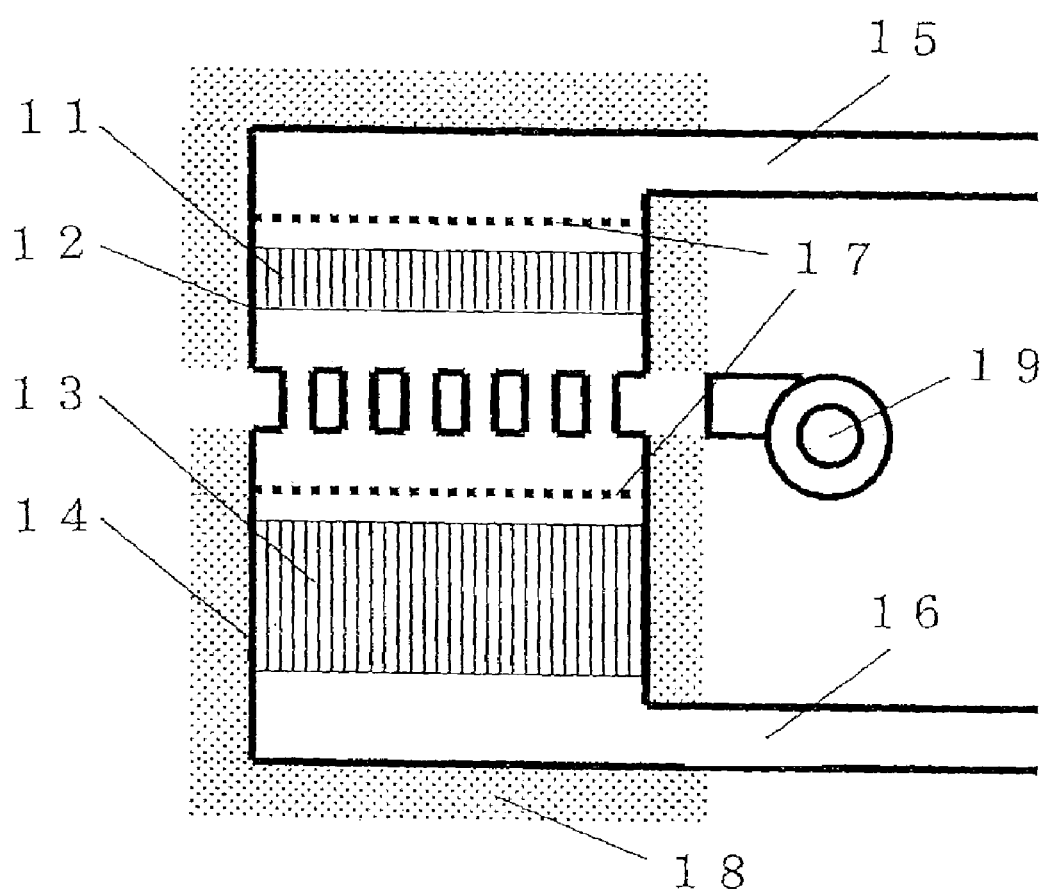
FIG. 2 is a schematic longitudinal sectional view showing the configuration of the hydrogen generator including the hydrogen purification apparatus according to Embodiments 2 and 6 of the present invention.

Embodiment 2 of the present invention will now be described. In this embodiment, as shown in FIG. 2, the catalyst body is divided into two stages, and a cooling unit is provided between the divided catalyst bodies, and the functional effect of this embodiment is for the most part similar to that of Embodiment 1. Therefore, this embodiment will be described focusing on the aspects different from those of Embodiment 1.

FIG. 2 is a schematic longitudinal sectional view showing the configuration of the hydrogen purification apparatus according to this embodiment. The catalyst body is divided into a first catalysis body 11 and a second catalyst body 13, and a cooling unit is provided between these catalyst bodies, and the reformed gas is cooled by a cooling fan 19, thereby making it possible to reduce the concentration of CO with a small amount of catalyst. Because the CO reformation reaction is an exothermic reaction, heat of reaction generated in the upstream of the catalyst body is transferred to the downstream by the reformed gas. Therefore, the temperature of the catalyst body tends to be higher in the downstream, and even though the concentration of CO is sufficiently reduced in the upstream, the concentration of CO is increased again due to a reverse reaction in the downstream of high temperature. Thus, the reverse reaction can be curbed by reducing the temperature of the second catalyst body 13 in the downstream to below the temperature of the first catalyst body 11.

A two-stage structure is employed in this embodiment, but the number of stages is not limited, and any structure allowing the catalyst body in each stage to be controlled to keep optimal temperature can provide high quality.

For example, the hydrogen purification apparatus according to this embodiment may be such that the carbon monoxide-shifting catalyst body is divided into a plurality of stages, and the divided carbon monoxide-shifting catalyst bodies are arranged one after another from the upstream to downstream of the route of the reformed gas, and a heat releasing unit for the reformed gas to release heat and a cooling unit to cool at least one side of the reformed gas are provided between the carbon monoxide-shifting catalyst bodies, and even such a structure can bring about effects similar to those described above.

Also, the cooling fan is used as cooling means, but cooling by water may also be used.

Example 1 and Example 2 will now be described below as Examples corresponding to Embodiment 1.

EXAMPLE 1

1% by atom of Pt, based on the atomic ratio of the total amount of Pt to the total amount of Mo, W, and Re, and Zr in the metal oxide or complex oxide and expressed as a % was carried on metal oxides or complex oxides 1 to 22 of which compositions are shown in Table 1, respectively. These were applied to cogierite honeycombs, and were placed as the catalyst body 1 in the reaction chamber 2 shown in FIG. 1.

A reformed gas containing 8% by volume of carbon monoxide, 8% by volume of carbon dioxide, 20% by volume of steam and 64% by volume of hydrogen was introduced at the flow rate of 10 liters per minute from the reformed gas inlet 3. The reformed gas was reacted with the catalyst body 1 with its temperature being controlled, and thereafter the composition of the gas discharged from the reformed gas outlet 4 was measured by gas chromatography.

The minimum concentration of CO and the concentration of methane in the gas after the reaction with the catalyst temperature of 400° C. were measured, and the operation of stopping and thereafter starting again the apparatus was repeated ten times, and then the concentration of CO was measured to observe a change in catalytic activity. The results thereof are summarized in Table 1.

TABLE 1

| Sample No. | Metal Oxide or Complex Metal Oxide | Concentration of CO (%) | Concentration of CO after Starting and Stopping Ten Times (%) | Concentration of Methane at 400° C. (%) |
|---|---|---|---|---|
| 1 | Zirconia | 0.62 | 0.63 | 1.52 |
| 2 | Molybdenum Oxide | 0.13 | 0.75 | 0.01 |
| 3 | Tungsten Oxide | 0.14 | 0.88 | 0.02 |
| 4 | Rhenium Oxide | 0.13 | 0.78 | 0.01 |
| 5 | Mo0.95Zr0.05Ox | 0.13 | 0.64 | 0.03 |
| 6 | Mo0.9Zr0.1Ox | 0.13 | 0.15 | 0.05 |
| 7 | Mo0.5Zr0.5Ox | 0.13 | 0.14 | 0.10 |
| 8 | Mo0.01Zr0.99Ox | 0.14 | 0.15 | 0.50 |
| 9 | Mo0.005Zr0.995Ox | 0.50 | 0.52 | 1.02 |
| 10 | Mo0.003Zr0.997Ox | 0.55 | 0.57 | 1.50 |
| 11 | W0.95Zr0.05Ox | 0.14 | 0.65 | 0.04 |
| 12 | W0.9Zr0.1Ox | 0.14 | 0.16 | 0.07 |
| 13 | W0.5Zr0.5Ox | 0.14 | 0.15 | 0.12 |
| 14 | W0.01Zr0.99Ox | 0.15 | 0.16 | 0.52 |
| 15 | W0.005Zr0.995Ox | 0.52 | 0.53 | 1.10 |
| 16 | W0.003Zr0.997Ox | 0.56 | 0.57 | 1.51 |
| 17 | Re0.95Zr0.05Ox | 0.13 | 0.64 | 0.01 |
| 18 | Re0.9Zr0.1Ox | 0.14 | 0.15 | 0.04 |
| 19 | Re0.5Zr0.5Ox | 0.15 | 0.14 | 0.12 |
| 20 | Re0.01Zr0.99Ox | 0.15 | 0.14 | 0.51 |
| 21 | Re0.005Zr0.995Ox | 0.49 | 0.52 | 1.01 |
| 22 | Re0.003Zr0.997Ox | 0.49 | 0.57 | 1.50 |

The experimental results shown in Table 1 support the aforesaid facts as described below. Molybdenum oxide is very active to the shift reaction, and is capable of curbing the methanation reaction, but the catalytic activity of molybdenum oxide is easily reduced by the repetitive starting and stopping of the apparatus, compared to zirconia. Also, when the complex oxide with Zr compounded with Mo is used as a catalyst carrier, the smaller the content of Mo, (1) the likelier it is that the catalytic activity is not reduced, but (2) the more easily the methanation reaction in the high temperature range proceeds, for example.

Furthermore, W and Re have chemical natures similar to those of Mo. Therefore, even if a complex oxide with W or Re compounded with Zr is used, experimental results similar to those obtained by using a complex oxide with Mo compounded with Zr can be obtained.

EXAMPLE 2

Measurements were carried out in the same way as Example 1 for samples of No. 23 to 32 carrying 0.5 to 3% by atom of Pt, based on the atomic ratio of the total amount of Pt to the total amount of Mo and Zr in the metal oxide or complex oxide and expressed as a % in which the contents of Mo are 1% by atom and 2% by atom, based on the atomic ratio of the total amount of Mo to the total amount of Mo and Zr in the complex oxide and expressed as a %. The results thereof are summarized in Table 2.

TABLE 2

| Sample No. | Metal Oxide or Complex Metal Oxide | Amount of Carried Pt (mol %) | Concentration of CO (%) | Concentration of Methane at 400° C. (%) |
|---|---|---|---|---|
| 23 | Mo0.01Zr0.99Ox | 0.5 | 0.30 | 0.30 |
| 24 | Mo0.01Zr0.99Ox | 1.0 | 0.14 | 0.50 |
| 25 | Mo0.01Zr0.99Ox | 1.5 | 0.13 | 0.70 |
| 26 | Mo0.01Zr0.99Ox | 2.0 | 0.13 | 0.90 |
| 27 | Mo0.01Zr0.99Ox | 3.0 | 0.13 | 1.20 |
| 28 | Mo0.02Zr0.98Ox | 0.5 | 0.29 | 0.28 |
| 29 | Mo0.02Zr0.98Ox | 1.0 | 0.13 | 0.30 |
| 30 | Mo0.02Zr0.98Ox | 1.5 | 0.10 | 0.35 |
| 31 | Mo0.02Zr0.98Ox | 2.0 | 0.08 | 0.40 |
| 32 | Mo0.02Zr0.98Ox | 3.0 | 0.08 | 0.70 |

The experimental results shown in Table 2 support the aforesaid facts as described below. As the amount of carried Pt is increased, the concentration of CO can be reduced to a lower level, but if the amount of Pt becomes larger than the amount of added Mo, the activity is no longer improved, and only the methanation activity is increased.

Example 3 will now be described below as Example corresponding to Embodiment 2.

EXAMPLE 3

1% by atom of Pt was carried on a complex oxide in which the ratio between Zr and Mo shown in Sample No. 7 in Table 1 used in Example 1 is 1:1. Cogierite honeycombs were coated with this material, and were placed in a first reaction chamber 12 and a second reaction chamber 14 shown in FIG. 2, respectively, with the total volume of the first catalyst body 11 and the second catalyst body 13 being identical to that of Example 1. A reformed gas containing 8% by volume of carbon monoxide, 8% by volume of carbon dioxide, 20% by volume of steam and 64% by volume of hydrogen was introduced at the flow rate of 10 liters per minute from a reformed gas inlet 15. The minimum concentration of CO and the concentration of methane in the gas after the reaction with the temperature of the first catalyst body 11 being 400° C. were 0.09% by volume and 0.06% by volume, respectively. In addition, the operation of stopping and thereafter starting again the apparatus was carried out ten times, and the concentration of CO was measured to observe a change in catalytic activity, and it was found that the concentration was 0.11% by volume.

Comparative Example 1 will now be described below as Comparative Example for Examples 1 to 3.

COMPARATIVE EXAMPLE 1

In this Comparative Example, a conventional copper-zinc catalyst was used as the catalyst body 1 in place of the complex oxide with Pt carried thereon, and this was placed in the chamber 2 shown in FIG. 1 in the same way as Example 1. A reformed gas containing 8% by volume of carbon monoxide, 8% by volume of carbon dioxide, 20% by volume of steam and 64% by volume of hydrogen was introduced at the flow rate of 10 liters per minute from the reformed gas inlet 3. The reformed gas was reacted with the catalyst body 1 with its temperature being controlled, and thereafter the composition of the gas discharged from the reformed gas outlet 4 was measured by gas chromatography to find that the minimum concentration of CO was 0.08% by volume. In addition, the operation of stopping and thereafter starting again the apparatus was repeated ten times, and the concentration of CO was measured to observe a change in catalytic activity, and it was found that the minimum concentration of CO was 4% by volume.

In this way, in the case where the catalyst body in this Comparative Example is used, the concentration of CO after repeating the startup and stop of the apparatus ten times is significantly high compared to the case where the catalyst body in the aforesaid Example is used. Therefore, as described previously, it has been demonstrated that the hydrogen purification apparatus of the present invention is hardly influenced by entrained oxygen even if the startup and stop of operation is repeated, and thus can be operated stably over an extended period.

As apparent from what has been described above, the present invention is a hydrogen purification apparatus comprising a reformed gas supplying unit supplying at least, for example, hydrogen gas, carbon monoxide and steam, and a reaction chamber having a carbon monoxide shifting catalyst body located in the downstream of the above described reformed gas supplying unit, and the above described carbon monoxide shifting catalyst body is a material in which at least Pt is carried on a complex oxide with at least Mo or W or Re compounded with Zr, for example.

At this time, it is preferable that the complex oxide has as its composition ratio 1 to 90% by atom of Mo and 10 to 99% by atom of Zr.

Furthermore, the element carried on the complex oxide of the present invention is Pt in the case of this embodiment described above, but it is not limited thereto, and in short, may be one of Pt, Pd, Rh and Ru. However, Pt is most preferably used because a precious metal catalyst having Pd, Rh, Ru and the like as active components may allow the methanation reaction to proceed as described previously. Therefore, when Pd, Rh, Ru and the like are used, it is desirable that the above described complex oxide carries at least Pt and has these elements added therein with Pt as a main component.

In this way, the hydrogen purification apparatus of the present invention has improved endurance of the CO transforming catalysis body, and thus can be operated stably even if the startup and stop of the apparatus is repeated.

EMBODIMENT 3

First, the configuration of the hydrogen purification apparatus in this embodiment will be described referring to FIG. 1.

In FIG. 1, reference numeral 1 denotes a CO shifting catalyst body (hereinafter also referred to simply as catalyst body), which has been placed inside a reaction chamber 2. Reference numeral 3 denotes a reformed gas inlet, from which the reformed gas is introduced. The reformed gas reacted in the catalyst body 1 is discharged from a reformed gas outlet 4.

Furthermore, a diffuser panel 5 is placed in the upstream of the catalyst body 1 so that the reformed gas is flown uniformly. Also, for keeping the reaction vessel at a fixed temperature, the periphery of some spaces was covered with a heat insulator 6 made of ceramic wool as required.

Here, the catalyst body 1 was prepared by coating a cogierite honeycomb with a material in which Ce and Pt are carried on Y-type zeolite of $SiO_2/Al_2O_3=5$ (molar ratio) (forger site type zeolite with silica-alumina ratio equal to or larger than 4).

Operations of the hydrogen purification apparatus in this embodiment will now be described. Fuels used for producing the reformed gas to be supplied to the hydrogen purification apparatus include natural gas, methanol and gasoline, and reforming methods include steam reforming in which steam is added, and partial reforming in which air is added to carry out reforming, but in this case, the case will be described where natural gas is subjected to steam reforming to obtain the reformed gas.

The composition of the reformed gas when natural gas is subjected to steam reforming more or less varies depending on the temperature of the reforming catalyst body, but the average value excluding steam is such that the content of hydrogen is about 80% by volume, and the contents of carbon dioxide and carbon monoxide are about 10% by volume, respectively.

Since the reforming reaction for natural gas is carried out at 500 to 800° C. while the shift reaction in which CO and steam are reacted with each other proceeds at 150 to 350° C., the reformed gas is supplied after being cooled just before the reformed gas inlet 3. The concentration of CO after the catalyst body 1 is passed is reduced to about 1% by volume, and the CO is discharged from the reformed gas outlet 4.

The operating principle of the hydrogen purification apparatus of this embodiment will now be described. The CO shift reaction is an equilibrium reaction dependent on temperature, and the concentration of CO can be reduced as the temperature at which the reaction is carried out is decreased. On the other hand, when the temperature is decreased, the reaction on the catalyst is slowed. Therefore, there is a temperature at which the concentration of CO takes a minimum value.

Copper based shifting catalysts such as a copper-zinc catalyst and a copper-chrome catalyst that are used as CO shifting catalysts in the conventional hydrogen purification apparatus can undergo the CO shift reaction at a low temperature of 150 to 250° C., and the concentration of CO can be reduced to about several hundreds to one thousand ppm depending on conditions.

However, the copper based catalyst needs to be activated by circulating reducing gas such as hydrogen and reformed gas after the reaction vessel is filled with the catalyst, and its heat-resistant temperature is as low as about 300° C. Therefore, the reducing gas should be diluted with an inert gas or the like before being supplied, or the reaction should be carried out slowly at a low flow rate in order to prevent the situation in which temperature is increased to above the heat-resistant temperature due to the heat of reaction at the time of activation, and thus it takes much time for activation. Also, at the time of starting the apparatus, heating should be carried out slowly for a long time in order to prevent the situation in which temperature is increased excessively to exceed the heat-resistant temperature, and thus the copper based catalyst has a lot of problems for applications where the apparatus is started and stopped frequently.

On the other hand, in the hydrogen purification apparatus of the present invention, a catalyst body having a precious metal as an active component is used as the catalyst body 1, thus eliminating the possibility that the catalyst is significantly deteriorated even if the temperature rises to as high as about 500° C. at the time of starting the apparatus. Also, unlike the copper based catalyst, it is not necessary to carry out long hours of reduction treatment for curbing heat generation by heat of the reduction reaction because the catalyst body 1 has high heat resistance. Also, even if air is entrained when the apparatus is stopped, the catalyst is less significantly deteriorated than the copper based catalyst.

Also, by using zeolite as a carrier, deterioration is also prevented because the active component is carried in high dispersion and zeolite as a carrier is strongly interacted with the precious metal.

Zeolite generally has silica and alumina as main components, and exhibits a variety of properties such as solid acidity and hydrophobicity depending on the ratio between the Al atom in trivalent electronic state and the Si atom in tetravalent electronic state. Zeolite used in this embodiment, of which $SiO_2/Al_2O_3$ ratio equals 5, is a hydrophobic zeolite having low affinity with water. At the time of starting the hydrogen purification apparatus, a gas containing a large amount of steam may be supplied to the apparatus before the temperature of the apparatus rises to a sufficiently high level. Therefore, in the past, active sites were covered with water condensed in the catalyst body, and thus it took much time before the reaction started, or the catalyst was heated by a heater. On the other hand, in the present invention, because hydrophobic zeolite is used, there is no possibility that water causes reduction in catalytic activity, and the reaction can be started quickly at a relatively low temperature.

Furthermore, precious metal catalysts having Pt, Pd, Rh, Ru and the like as active components have relatively low reaction selectivity because of high activity. Therefore, the methanation reaction of CO or carbon dioxide may also proceed as a secondary reaction of the CO shift reaction depending on conditions, and thus there is apprehension that consumption of hydrogen due to the proceeding methanation reaction reduces efficiency of the entire apparatus.

Usually, the methanation reaction becomes active as the temperature is increased in the temperature range of from 150 to 450° C. at which the CO shift reaction is carried out, but the production rate of methane also varies depending on the type of precious metals. This is because the CO absorption mechanism varies depending on the type of precious metals, and Pd, Rh and Ru having CO adsorption mechanisms allowing the methanation reaction to proceed easily cause methane to be produced at relatively low temperature, thus narrowing the range of temperature at which the CO shift reaction can be carried out. On the other hand, the Pt catalyst for use in this embodiment does not cause the methanation reaction easily, and thus allows the CO shift reaction to be carried out in the wide range of temperature. Therefore, there is no possibility that a large amount of hydrogen is consumed due to the proceeding methanation reaction, and thus the hydrogen purification apparatus of this embodiment can be operated efficiently.

Also, for the amount of precious metal to be carried, any amount keeping the degree of dispersion of the precious metal at a high level and allowing required activity to be exhibited is preferable. The precious metal particles are enlarged to increase the amount of precious metal not contributing to the reaction as the content of precious metal is increased, and conversely, sufficient activity cannot be obtained if the content of precious metal is small. Therefore, the content of precious metal is preferably in the range of 0.1 to 5% by weight with respect to the amount of catalyst carrier, as in the case of usual precious metal catalysts for combustion and for purification of exhausts.

Also, Ce helps curb the methanation reaction on the precious metal catalyst. For the precious metal catalyst, alumina, silica, titanium oxide and the like are usually used as a catalyst carrier, but when they are used for the shift reaction, the methanation reaction tends to proceed at a temperature of 300° C. or higher. If Ce is made to coexist with the precious metal, the methanation reaction hardly proceeds even at a temperature as high as 450° C. A similar effect can be obtained by adding a transition metal selected from Cu, Fe, Cr, Re, Mo and W instead of Ce.

Cu, Fe, Cr, Ce, Re, Mo and W are added preferably in the amount allowing them to be carried in pores of zeolite efficiently, and the most effective amount is 0.5 to 10% by weight.

Also, zeolite of Y-type structure is used in this embodiment, the structure of zeolite is not particularly limited, and may be of L-type, mordenite type, ZSM-5 type or beta-type as long as it has pores sufficiently large for reacting gases (CO and water molecules). They have pores of 0.5 to 1 nm, and allow active sites in the pores to act effectively, thus making it possible to obtain high activity.

Also, zeolite in which the silica-alumina ratio of $SiO_2/Al_2O_3$ equals 5 is used in this embodiment, but as long as the ratio equals 4 or greater, high performance can be obtained. Also, hydrohobicity is increased to bring about preferred properties as the ratio of silica is increased, but if the silica-alumina ratio of $SiO_2/Al_2O_3$ is greater than 200, the properties remain unchanged even though the ratio of silica is increased.

Also, as for the shape of catalyst body, a cogierite honeycomb coated with the catalysis is used in this embodiment, but even if zeolite is shaped into pellets, and is impregnated with a precious metal salt to prepare a CO shifting catalyst body, a CO shifting catalyst body having similar performance can be obtained.

Also, Ce and Pt are carried on zeolite in this embodiment, but even if a metal oxide such as cerium oxide with a precious metal carried thereon is mixed with zeolite, a similar effect can be obtained.

EMBODIMENT 4

Embodiment 4 of the invention will now be described. This embodiment is similar to Embodiment 3 except that an air supplying unit 25 (or oxidizing gas supplying unit) is provided in the upstream of a catalyst body 21 as shown in FIG. 3.

Figure 3:
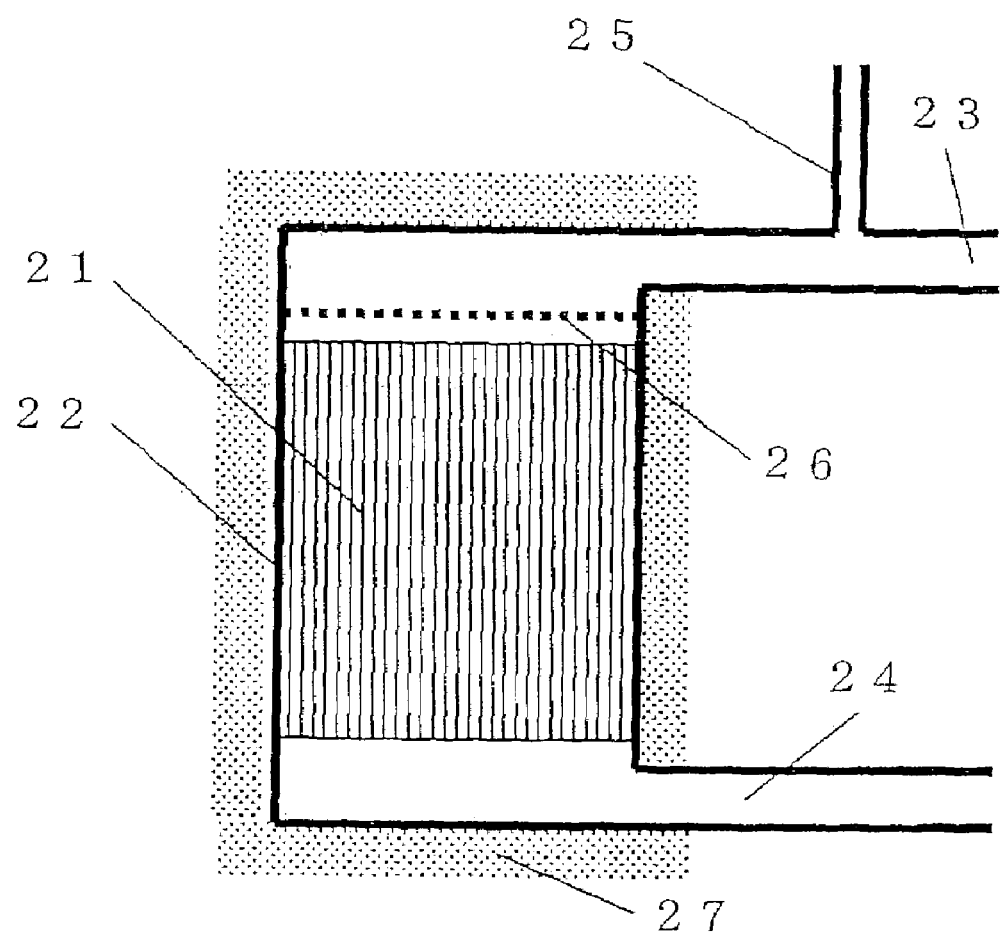
FIG. 3 is a schematic longitudinal sectional view showing the configuration of the hydrogen generator including the hydrogen purification apparatus according to Embodiment 4 of the present invention.

FIG. 3 is a schematic cross sectional view showing the configuration of the hydrogen purification apparatus according to this embodiment. In FIG. 3, reference numeral 21 denotes a CO shifting catalyst body (hereinafter also referred to simply as catalyst body), which has been placed inside a reaction chamber 22. Reference numeral 23 denotes a reformed gas inlet, from which the reformed gas is introduced. The reformed gas reacted in the catalyst body 21 is discharged from a reformed gas outlet 24.

Furthermore, a diffuser panel 26 is placed in the upstream of the catalyst body 21 so that the reformed gas is flown uniformly. Also, for keeping the reaction vessel at a fixed temperature, the periphery of some spaces was covered with a heat insulator 27 made of ceramic wool as required.

Here, the catalyst body 21 was prepared by coating a cogierite honeycomb with a material in which Ce and Pt are carried on Y-type zeolite of $SiO_2/Al_2O_3=5$ (molar ratio) (forger site type zeolite with silica-alumina ratio equal to or larger than 4).

By supplying air from the air supplying unit 25, hydrogen or carbon monoxide in the reformed gas is oxidized with the catalyst body 21. Usually, water is condensed on the catalyst, and the oxidization reaction poorly proceeds until the temperature of the catalyst body 21 rises to a sufficient level during startup. For this reason, heat generation does not occur even if air is added, and therefore it takes much time for startup. Here in this embodiment, hydrophobic zeolite is contained in the catalyst body 21, and thus the oxidization reaction proceeds on the catalyst body 21 even if a large amount of steam is contained, as during startup of the apparatus, and thus the temperature of the catalyst body 21 rises quickly. Furthermore, the amount of air to be added varies depending on the configuration of the apparatus and the like, and is not particularly limited, but the amount of air should be selected so that the temperature of the catalyst rises quickly, and the temperature of the catalyst body does not rise excessively.

Also, if Cu is carried on (or contained in) zeolite used in the catalyst body 21, the supplied air oxidizes Cu to generate heat at a temperature lower than the temperature at which the oxidization reaction of the catalyst is started, and therefore the temperature of the catalyst body 21 rises more quickly. When the supply of air is stopped, copper once oxidized is reduced again by the reformed gas, and is therefore returned to its original metal state, and can generate heat again at the next startup.

Embodiments 4 and 5 will now be described below as the Example corresponding to Embodiment 3.

EXAMPLE 4

As shown in Table 3, 1% by weight of Cu, Fe, Cr, Ce, Re, Mo and W were carried, and 1% by weight of precious metals (the specific type of precious metal is described in Table) were carried, respectively, to Y-type zeolite (described as Y in Table) with the silica-alumina ratio of $SiO_2/Al_2O_3$ equal to 5. 1% by weight of Ce was carried, and 1% by weight of Pt was carried on L-type, mordenite-type, ZSM 5-type and beta-type zeolite (described as L. M. ZSM5 and β, respectively, in Table) with the silica-alumina ratio of $SiO_2/Al_2O_3$ equal to 5, respectively. Cogierite honeycombs were coated with these materials, and placed in the reaction chamber 2 shown in FIG. 1.

A reformed gas containing 8% by volume of carbon monoxide, 8% by volume of carbon dioxide, 20% by volume of steam and 64% by volume of hydrogen was introduced at the flow rate of 10 liters per minute from the reformed gas inlet 3. The reformed gas was reacted with the catalyst 1 with its temperature being controlled, and thereafter the composition of the gas discharged from the reformed gas outlet 4 was measured by gas chromatography.

The minimum concentration of CO when the temperature is changed and the concentration of methane in the gas after the reaction with the catalyst temperature of 400° C. were measured, and the operation of stopping and thereafter starting again the apparatus was repeated ten times, and then the minimum concentration of CO was measured to observe a change in catalytic activity. The results thereof are summarized in Table 3.

TABLE 3

| Sample No. | Sample | Concentration of CO (%) | Concentration of CO after Starting and Stopping Ten Times (%) | Concentration of Methane at 400° C. (%) |
|---|---|---|---|---|
| 1 | Pt/Cu/Y | 0.30 | 0.40 | 0.01 |
| 2 | Pt/Fe/Y | 0.60 | 0.62 | 0.02 |
| 3 | Pt/Cr/Y | 0.90 | 0.91 | 0.03 |
| 4 | Pt/Ce/Y | 0.40 | 0.40 | 0.03 |
| 5 | Pt/Re/Y | 0.45 | 0.60 | 0.04 |
| 6 | Pt/Mo/Y | 0.55 | 0.65 | 0.02 |
| 7 | Pt/W/Y | 0.70 | 0.75 | 0.02 |
| 8 | Ru/Ce/Y | 0.90 | 0.92 | 1.70 |
| 9 | Rh/Fe/Y | 0.80 | 0.82 | 1.02 |
| 10 | Pd/Fe/Y | 0.70 | 0.71 | 0.70 |
| 11 | Pt/Ce/L | 0.41 | 0.41 | 0.03 |
| 12 | Pt/Ce/M | 0.42 | 0.42 | 0.03 |
| 13 | Pt/Ce/ZSM5 | 0.40 | 0.40 | 0.03 |
| 14 | Pt/Ce/β | 0.43 | 0.43 | 0.03 |

The experimental results shown in Table 3 support the aforesaid facts as described below. The Y-type zeolite carrying Cu, Fe, Cr, Ce, Re, Mo and W and Pt is highly active, and is capable of curbing the methanation reaction. Particularly, Ce is the most effective. Also, if Ru, Pd and Rh are used in place of Pt, the methanation reaction tends to occur to increase the concentration of methane.

Also, even if L-type, mordenite-type, ZSM 5-type and beta-type zeolite is used, an effect similar to that of Y-type zeolite can be obtained.

EXAMPLE 5

For catalyst bodies whose zeolite has the silica-alumina ratio of 1 to 1000 as shown in Table 4, in Pt/Ce/Y type (forger site type) zeolite shown in Sample 4 in Table 3 used in Example 4, the cogierite honeycomb was coated with the catalyst body, and was placed in the reaction chamber 2 shown in FIG. 1 in the same way as Example 4.

The time elapsed before the temperature of the catalyst body 1 rose to reduce the concentration of CO to below 1% by volume after introduction of a reformed gas containing 8% by volume of carbon monoxide, 8% by volume of carbon dioxide, 20% by volume of steam and 64% by volume of hydrogen was introduced at the flow rate of 10 liters per minute from the reformed gas inlet 3 was started (startup time) was measured. The results thereof are summarized in Table 4.

TABLE 4

| Sample No. | Silica/Alumina Ratio | Startup Time (min) |
|---|---|---|
| 15 | 1 | 50 |
| 16 | 2 | 35 |
| 17 | 3 | 20 |
| 18 | 4 | 6 |
| 19 | 5 | 5 |
| 20 | 10 | 4 |
| 21 | 50 | 2 |
| 22 | 200 | 2 |
| 23 | 1000 | 2 |

Examples 6 and 7 will now be described below as the Example corresponding to Embodiment 4.

EXAMPLE 6

The startup time was measured in the same way as Example 5, while the air supplying unit 14 was provided in the upstream of the catalyst body 21 as shown in FIG. 3, and air was supplied therefrom at the flow rate of 0.2 liters per minute. The results thereof are summarized in Table 5.

TABLE 5

| Sample No. | Silica/Alumina Ratio | Startup Time (min) |
| --- | --- | --- |
| 24 | 1 | 35 |
| 25 | 2 | 25 |
| 26 | 3 | 18 |
| 27 | 4 | 3 |
| 28 | 5 | 2 |
| 29 | 10 | 1 |
| 30 | 50 | 1 |
| 31 | 200 | 1 |
| 32 | 1000 | 1 |

EXAMPLE 7

For catalyst bodies whose zeolite has the silica-alumina ratio of 1 to 1000 as shown in Table 6, in Pt/Cu/Y type zeolite shown in Sample 1 in Table 3 used in Example 4, the startup time was measured in the same way as Example 6. The results thereof are summarized in Table 6.

TABLE 6

| Sample No. | Silica/Alumina Ratio | Startup Time (min) |
| --- | --- | --- |
| 33 | 1 | 25 |
| 34 | 2 | 15 |
| 35 | 3 | 10 |
| 36 | 4 | 2 |
| 37 | 5 | 1 |
| 38 | 10 | 0.5 |
| 39 | 50 | 0.5 |
| 40 | 200 | 0.5 |
| 41 | 1000 | 0.5 |

Comparative Examples 2 to 4 will now be described below as the Comparative Example corresponding to Examples 4 to 7.

COMPARATIVE EXAMPLE 2

Oxides and materials with 1% by weight of precious metal carried on alumina 42 to 47, of which compositions are shown in Table 7, were used as the catalyst body 1 in place of the materials with rare earth metals or transition metals carried on zeolite of the present invention, and they were placed in the reaction chamber 2 shown in FIG. 1 in the same way as Example 4. A reformed gas containing 8% by volume of carbon monoxide, 8% by volume of carbon dioxide, 20% by volume of steam and 64% by volume of hydrogen was introduced at the flow rate of 10 liters per minute from the reformed gas inlet 3. The reformed gas was reacted with the catalyst 1 with its temperature being controlled, and thereafter the composition of the gas discharged from the reformed gas outlet 4 was measured by gas chromatography. The minimum concentration of CO when the temperature is changed and the concentration of methane in the gas after the reaction with the catalyst temperature of 400° C. were measured, and the operation of stopping and thereafter starting again the apparatus was repeated ten times, and then the minimum concentration of CO was measured to observe a change in catalytic activity. The results thereof are summarized in Table 7.

TABLE 7

| Sample No. | Metal Oxide or Complex Oxide | Concentration of CO (%) | Concentration of CO after Starting and Stopping Ten Times (%) | Concentration of Methane at 400° C. (%) |
| --- | --- | --- | --- | --- |
| 42 | Fe0.9Cr0.1Ox | 3.5 | 3.5 | 0.004 |
| 43 | Copper-Zinc | 0.1 | 6.2 | 0.001 |
| 44 | Pt/Alumina | 2.1 | 2.1 | 1.20 |
| 45 | Ru/Alumina | 1.9 | 1.9 | 5.5 |
| 46 | Pd/Alumina | 2.5 | 2.5 | 1.81 |
| 47 | Rh/Alumina | 2.0 | 2.0 | 4.5 |

COMPARATIVE EXAMPLE 3

1% by weight of Pt was carried on cerium oxide in place of the Pt/Ce/Y type zeolite shown in Sample 4 in Table 3 used in Example 4, and the cogierite honeycomb was coated with the material in the same way as in Example 4, and was placed in the reaction chamber 2 shown in FIG. 1.

The time elapsed before the temperature of the catalyst body 1 rose to reduce the concentration of CO to below 1% by volume after introduction of a reformed gas containing 8% by volume of carbon monoxide, 8% by volume of carbon dioxide, 20% by volume of steam and 64% by volume of hydrogen was introduced at the flow rate of 10 liters per minute from the reformed gas inlet 3 was started (startup time) was measured, and as a result it was found that the startup time equaled 55 minutes.

COMPARATIVE EXAMPLE 4

The startup time was measured in the same way as Comparative Example 3, while the air supplying unit 25 was provided in the upstream of the catalyst body 21 as shown in FIG. 3 in Comparative Example 3, and air was supplied therefrom at the flow rate of 0.2 liters per minute, and as a result it was found that the startup time equaled 40 minutes.

In this way, the following fact is supported if the catalyst body in this Comparative Example is used. The complex oxide of iron and chrome not containing a precious metal is not capable of reducing CO sufficiently, and the copper-zinc catalyst has high initial activity, but the activity is reduced considerably if the operation is repeatedly started and stopped. Also, for the catalyst body with a precious metal carried on alumina, the activity is not reduced, but the concentration of methane at 400° C. is high. Also, the startup time could be shortened by using zeolite.

As apparent from what has been described above, in this way, the hydrogen purification apparatus of the present invention has improved endurance of the CO shifting catalyst body, and can be operated stably even if the apparatus is started and stopped repeatedly, and is capable of reducing the startup time.

EMBODIMENT 5

First, referring to FIG. 1, the configuration of the hydrogen purification apparatus in this embodiment will be described referring to FIG. 1.

In FIG. 1, reference numeral 1 denotes a CO shifting catalyst body (hereinafter also referred to simply as catalyst body), which has been placed inside a reaction chamber 2. Reference numeral 3 denotes a reformed gas inlet, from which the reformed gas is introduced. The reformed gas reacted in the CO shifting catalyst body 1 is discharged from a reformed gas outlet 4.

Furthermore, a diffuser panel 5 is placed in the upstream of the catalyst body 1 so that the reformed gas is flown uniformly. Also, for keeping the reaction vessel at a fixed temperature, the periphery of some spaces was covered with a heat insulator 6 made of ceramic wool as required.

Here, for the catalyst body 1, a material having a cogierite honeycomb coated with a catalyst with Pt carried on a complex oxide of iron (hereinafter referred to as Fe) and chrome (hereinafter referred to as Cr) was used.

Operations of the hydrogen purification apparatus in this embodiment will now be described.

Fuels used for producing the reformed gas to be supplied to the hydrogen purification apparatus include natural gas, methanol and gasoline, and reforming methods include steam reforming in which steam is added, and partial reforming in which air is added to carry out reforming, but in this case, the case will be described where natural gas is subjected to steam reforming to obtain the reformed gas.

The composition of the reformed gas when natural gas is subjected to steam reforming more or less varies depending on the temperature of the reforming catalyst body, but the average value excluding steam is such that the content of hydrogen is about 80% by volume, and the contents of carbon dioxide and carbon monoxide are about 10% by volume, respectively.

Since the reforming reaction for natural gas is carried out at 500 to 800° C. while the shift reaction in which CO and steam are reacted with each other proceeds at 150 to 300° C., the reformed gas is supplied after being cooled just before the reformed gas inlet 3. The concentration of CO after the CO shifting catalyst body 1 is passed is reduced to about 1% by volume, and the CO is discharged from the reformed gas outlet 4.

The operating principle of the hydrogen purification apparatus of this embodiment will now be described.

The CO shift reaction is an equilibrium reaction dependent on temperature, and the concentration of CO can be reduced as the temperature at which the reaction is carried out is decreased. On the other hand, when the temperature is decreased, the reaction on the catalyst is slowed. Therefore, there is a temperature at which the concentration of CO takes a minimum value.

Copper based shifting catalysts such as a copper-zinc catalyst and a copper-chrome catalyst that are used as CO shifting catalysts in the conventional hydrogen purification apparatus can undergo the CO shift reaction at a low temperature of 150 to 250° C., and the concentration of CO can be reduced to about several hundreds to one thousand ppm depending on conditions.

However, as described in the section of prior art, the copper based catalyst needs to be activated by circulating reducing gas such as hydrogen and reformed gas after the reaction vessel is filled with the catalyst, and its heat-resistant temperature is as low as about 300° C. Therefore, the reducing gas should be diluted with an inert gas or the like before being supplied, or the reaction should be carried out slowly at a low flow rate in order to prevent the situation in which temperature is increased to above the heat-resistant temperature due to the heat of reaction at the time of activation, and thus it takes much time to carry out the reaction. Also, at the time of starting the apparatus, heating should be carried out slowly for a long time in order to prevent the situation in which temperature is increased excessively to exceed the heat-resistant temperature, and thus the copper based catalyst has a lot of problems for applications where the apparatus is started and stopped frequently.

On the other hand, in the hydrogen purification apparatus of the present invention, a catalyst body with Pt carried on the complex oxide of Fe and Cr having high heat resistance is used as the catalyst body 1, thus eliminating the possibility that the catalyst is significantly deteriorated even if the temperature rises to as high as about 500° C. at the time of starting the apparatus. Also, unlike the copper based catalyst, it is not necessary to carry out long hours of reduction treatment for curbing heat generation by heat of the reduction reaction because the catalyst body 1 has high heat resistance. Also, even if air is entrained when the apparatus is stopped, the catalyst is less significantly deteriorated than the copper based catalyst.

The oxides of Fe and Cr exhibit activity for the shift reaction even with each single oxide, but because of low reaction velocity, they should be used at a high temperature of 400° C. or higher allowing the reaction velocity to be enhanced, or they should be used at a low space velocity (SV) with a large amount of catalyst. If they are used at high temperature, the equilibrium concentration of CO is increased, thus making it impossible to reduce CO sufficiently. Also, if a large amount of catalyst is used, miniaturization of the apparatus becomes difficult. If Fe and Cr are compounded together, the heat resistance is improved, and the oxidation-reduction of the oxide associated with the reaction proceeds smoothly, and therefore the reaction velocity is enhanced, and activity is exhibited even in the temperature range around 350° C., but the concentration of CO can be reduced to only about 2% by volume at best, and thus the activity is not sufficiently high.

Here, if a precious metal is added to the complex oxide of Fe and Cr, the reaction velocity is enhanced, and thus activity is exhibited even in the temperature range of about 200 to 300° C. This is due to the fact that CO is highly adsorptive for the precious metal, and that the precious metal promotes oxidation and reduction of Fe and Cr.

Furthermore, precious metal catalysts having Pt, Pd, Rh, Ru and the like as active components have relatively low reaction selectivity because of high activity. Therefore, the methanation reaction of CO or carbon dioxide may also proceed as a secondary reaction of the CO shift reaction depending on conditions, and thus there is apprehension that consumption of hydrogen due to the proceeding methanation reaction reduces efficiency of the entire apparatus.

Usually, the methanation reaction becomes active as the temperature is increased in the temperature range of from 150 to 450° C. at which the CO shift reaction is carried out, but the production rate of methane also varies depending on the type of precious metals. This is because the CO adsorption mechanism varies depending on the type of precious metals, and Pd, Rh and Ru having CO adsorption mechanisms allowing the methanation reaction to proceed easily cause methane to be produced at relatively low temperature, thus narrowing the range of temperature at which the CO shift reaction can be carried out. On the other hand, the Pt catalyst for use in this embodiment does not cause the methanation reaction easily, and thus allows the CO shift reaction to be carried out in the wide range of temperature. Therefore, there is no possibility that a large amount of hydrogen is consumed due to the proceeding methanation reaction, and thus the hydrogen purification apparatus of this embodiment can be operated efficiently.

Also, Fe and Cr help curb the methanation reaction on the precious metal catalyst. For the precious metal catalyst, alumina, silica, titanium oxide and the like are usually used as a catalyst carrier, but when they are used for the shift reaction, the methanation reaction tends to proceed at a temperature of 300° C. or higher. If the oxide of Fe and Cr is used as a catalyst carrier, the methanation reaction hardly proceeds even at a temperature as high as 450° C.

In the case of the hydrogen purification apparatus of the present invention, a complex oxide with Fe compounded with Cr is used as a catalyst carrier, and thus stability of the catalyst carrier is improved, and it is unlikely that the catalysts activity will be reduced.

For the ratio between Fe and Cr, heat resistance is reduced as the content of Cr decreases (namely, the content of Fe increases). Therefore, it is preferable that the content of Cr is 1% by atom or larger with respect to Fe. However, if the content of Cr is larger than 50% by atom, obtained performance will be limited to the level almost identical to that of chrome oxide. That is, the hydrogen purification apparatus can bring about an effect similar to that described above if the composition ratio of elements in the oxide excluding oxygen is such that the content of Cr is 1 to 50 percent by atom with respect to the content of Fe.

Furthermore, the method of compounding Cr with Fe is not particularly limited, and for example, the coprecipitation process, the sol-gel process, the alkoxide method and the like may be used. Also, iron oxide may be impregnated with a solution of Cr salt.

Also, in this embodiment, a complex oxide with Cr compounded with Fe is used, but even if, instead thereof, a material with Fe and Cr compounded with a catalyst carrier having a large specific surface area such as alumina, silica alumina, zirconia or the like is used, a similar effect can be obtained.

Also, in this embodiment, for the shape of catalyst body, a catalyst body with a cogierite honeycomb coated with a catalyst is used, but a CO shifting catalyst body having a similar capability can be obtained even if the carrier is of pellet type, and it is impregnated with salt of Pt to prepare a CO shifting catalyst body.

Also, for the amount of precious metal to be carried, any amount keeping the degree of dispersion of the precious metal at a high level and allowing required activity to be exhibited. The precious metal particles are enlarged to increase the amount of precious metal not contributing to the reaction as the content of precious metal is increased, and conversely, sufficient activity cannot be obtained if the content of precious metal is small. Therefore, the content of precious metal is preferably in the range of from 0.1 to 10% by weight with respect to the amount of catalyst carrier, as in the case of usual precious metal catalysts for combustion and for purification of exhausts.

EMBODIMENT 6

Embodiment 6 of the present invention will now be described. In this embodiment, as shown in FIG. 2, the catalyst body is divided into two stages, and a cooling unit is provided between the divided catalyst bodies, and the functional effect of this embodiment is for the most part similar to that of Embodiment 5. Therefore, this embodiment will be described focusing on the aspects different from those of Embodiment 5.

FIG. 2 is a schematic longitudinal sectional view showing the configuration of the hydrogen purification apparatus according to this embodiment. The catalyst body is divided into a first catalysis body 11 and a second catalyst body 13, and a cooling unit 20 is provided between these catalyst bodies, thereby making it possible to reduce the concentration of CO with a small amount of catalyst. For the cooling unit, a plurality of pipes through which air passes are provided in the example of FIG. 2. A heat recovery unit may be provided in place of the cooling unit.

Because the CO reformation reaction is an exothermic reaction, heat of reaction generated in the upstream of the catalyst body is transferred to the downstream by the reformed gas. Therefore, the temperature of the catalyst body tends to be higher in the downstream, and even though the concentration of CO is sufficiently reduced in the upstream, the concentration of CO is increased again due to a reverse reaction in the downstream of high temperature. Thus, the reverse reaction can be curbed by reducing the temperature of the second catalyst body 13 in the downstream to below the temperature of the first catalyst body 11.

A two-stage structure is employed in this embodiment, but the number of stages is not limited, and any structure allowing the catalyst body in each stage to be controlled to keep optimal temperature can provide high quality. Specifically, even if the carbon oxide shifting catalyst body is structured in multiple stages, and the cooling unit or the heat recovery unit is provided at between catalyst bodies constituting respective stages, a similar effect can be obtained.

Also, the reaction chamber is divided into the first reaction chamber 12 and the second reaction chamber 14 in this embodiment, but it is not necessary to divide the reaction chamber if a radiation fin or the like, for example, is provided at some midpoint between the first catalysis body 11 and the second catalyst body 13 as means of decreasing the temperature of the reformed gas.

Also, in this embodiment, the same type of catalyst is used for the first catalyst body 11 and the second catalyst body 13, but by using as the second catalyst body a catalysis body that is more active at low temperature than the first catalysis body, the concentration of CO can further be reduced. For the second catalyst body 13, ant catalyst body is acceptable as long as it is more active for the shift reaction at low temperature than the first catalysis body, but preferable are, for example, catalyst bodies with Pt carried on the complex oxide of Zr and Ce, and copper-zinc catalysts.

Also, the above hydrogen purification apparatus is a hydrogen purification apparatus comprising a carbon monoxide shifting catalyst body removing carbon monoxide from a reformed gas containing hydrogen, carbon monoxide and steam, and the carbon monoxide shifting catalyst body is structured in multiple stages, in which a first catalyst body containing an oxide containing at least one element of Fe and Cr and at least one element of Pt, Pd, Rh and Ru may be placed on at least one of the stages, and a second catalyst body that is more active at low temperature than the first catalyst body may be placed on at least one of the stages below the first catalyst body, and in this case, a similar effect can be obtained.

Also, the second catalyst body 13 may have Pt carried on an oxide including at least one element of Zr, Ce and Al, and in this case, an effect similar to that described above can be obtained.

Also, the second catalyst body may contain at least Cu and Zn, and in this case, an effect similar to that described above can be obtained.

Example 8 will now be described below as the Example corresponding to Embodiment 5.

EXAMPLE 8

1% by weight of precious metal (the type of precious metal is described in Table) was carried on metal oxides or complex oxides 1 to 10 of which compositions are shown in Table 8. Cogierite honeycombs were coated with these materials, and were placed in the reaction chamber 2 shown in FIG. 1.

A reformed gas containing 8% by volume of carbon monoxide, 8% by volume of carbon dioxide, 20% by volume of steam and 64% by volume of hydrogen was introduced at the flow rate of 10 liters per minute from the reformed gas inlet 3. The reformed gas was reacted with the catalyst 1 with its temperature being controlled, and thereafter the composition of the gas discharged from the reformed gas outlet 4 was measured by gas chromatography.

The minimum concentration of CO when the temperature is changed and the concentration of methane in the gas after the reaction with the catalyst temperature of 400° C. were measured, and the operation of stopping and thereafter starting again the apparatus was repeated ten times, and then the minimum concentration of CO was measured to observe a change in catalytic activity. The results thereof are summarized in Table 8.

TABLE 8

| Sample No. | Metal Oxide or Complex Oxide | Concentration of CO (%) | Concentration of CO after Starting and Stopping Ten Times (%) | Concentration of Methane at 400° C. (%) |
|---|---|---|---|---|
| 1 | Pt/Iron oxide | 0.80 | 1.30 | 0.01 |
| 2 | Pt/Chrome oxide | 1.30 | 1.35 | 0.05 |
| 3 | Pt/Fe0.995Cr0.005Ox | 0.80 | 1.30 | 0.01 |
| 4 | Pt/Fe0.99Cr0.01Ox | 0.75 | 0.78 | 0.01 |
| 5 | Pt/Fe0.9Cr0.1Ox | 0.70 | 0.70 | 0.02 |
| 6 | Pt/Fe0.55Cr0.45Ox | 0.80 | 0.81 | 0.04 |
| 7 | Pt/Fe0.45Cr0.55Ox | 1.30 | 1.35 | 0.05 |
| 8 | Ru/Fe0.9Cr0.1Ox | 0.90 | 0.92 | 1.70 |
| 9 | Pd/Fe0.9Cr0.1Ox | 0.80 | 0.83 | 1.02 |
| 10 | Rh/Fe0.9Cr0.1Ox | 0.70 | 0.71 | 1.50 |

The experimental results shown in Table 8 support the aforesaid fact as described below. The iron oxide with Pt carried thereon has very high activity for the shift reaction, and is capable of curbing the methanation reaction, but is more vulnerable to reduction in catalytic activity by the repeated startup and stop of the apparatus, compared to chrome oxide with Pt carried thereon.

Also, when the complex oxide with Cr compounded with Fe is used as a catalyst carrier, the larger the content of Cr, the unlikelier the catalytic activity is reduced if the content of Cr is 1% by atom or larger, but if the content is larger than 50% by atom, the effect of compounding chrome oxide with iron oxide is eliminated, and the level of activity of the compound oxide is identical to that of chrome oxide with Pt carried thereon.

Also, if Ru, Pd and Rh are used in place of Pt, the methanation reaction tends to occur to increase the concentration of methane.

Example 9 will now be described below as the Example corresponding to Embodiment 6.

EXAMPLE 9

1% by atom of Pt was carried on a complex oxide in which the ratio between Fe and Cr shown in Sample No. 5 in Table 8 used in Example 8 is 9:1. Cogierite honeycombs were coated with this material, and were placed in a first reaction chamber 12 and a second reaction chamber 14 shown in FIG. 12, respectively, with the total volume of the first catalyst body 11 and the second catalyst body 13 being identical to that of Example 8.

A reformed gas containing 8% by volume of carbon monoxide, 8% by volume of carbon dioxide, 20% by volume of steam and 64% by volume of hydrogen was introduced at the flow rate of 10 liters per minute from a reformed gas inlet 15. The minimum concentration of CO and the concentration of methane in the gas after the reaction with the temperature of the first catalyst body 11 being 400° C. were 0.30% by volume and 0.005% by volume, respectively. In addition, the operation of stopping and thereafter starting again the apparatus was carried out ten times, and the concentration of CO was measured to observe a change in catalytic activity, and it was found that the concentration was 0.30% by volume.

Comparative Example 6 will now be described below as the Comparative Example corresponding to Examples 8 and 9.

COMPARATIVE EXAMPLE 5

Oxides and materials with 1% by weight of precious metal carried on alumina 11 to 19, of which compositions are shown in Table 9, were used as the catalyst body 1 in place of the materials with Pt carried on oxides of the present invention, and they were placed in the reaction chamber 2 shown in FIG. 1 in the same way as Example 8.

A reformed gas containing 8% by volume of carbon monoxide, 8% by volume of carbon dioxide, 20% by volume of steam and 64% by volume of hydrogen was introduced at the flow rate of 10 liters per minute from the reformed gas inlet 3. The reformed gas was reacted with the catalyst 1 with its temperature being controlled, and thereafter the composition of the gas discharged from the reformed gas outlet 4 was measured by gas chromatography. The minimum concentration of CO when the temperature is changed and the concentration of methane in the gas after the reaction with the catalyst temperature of 400° C. were measured, and the operation of stopping and thereafter starting again the apparatus was repeated ten times, and then the minimum concentration of CO was measured to observe a change in catalytic activity. The results thereof are summarized in Table 9.

TABLE 9

| Sample No. | Metal Oxide or Complex Oxide | Concentration of CO (%) | Concentration of CO after Starting and Stopping Ten Times (%) | Concentration of Methane at 400° C. (%) |
|---|---|---|---|---|
| 11 | Oxide Iron | 3.7 | 4.8 | 0.005 |
| 12 | Chrome Oxide | 4.5 | 4.6 | 0.01 |
| 13 | Fe0.9Cr0.1Ox | 3.5 | 3.5 | 0.004 |
| 14 | Copper-Zinc | 0.1 | 6.2 | 0.001 |
| 15 | Pt/Alumina | 2.1 | 2.1 | 1.20 |
| 16 | Ru/Alumina | 1.9 | 1.9 | 5.5 |
| 17 | Pd/Alumina | 2.5 | 2.5 | 1.81 |
| 18 | Rh/Alumina | 2.0 | 2.0 | 4.5 |
| 19 | Pt/Ce0.5Zr0.5Ox | 0.2 | 0.2 | 0.40 |

In this way, if the catalyst body in this Comparative Example is used, the following fact is supported by the experimental results shown in Table 9. The iron oxide, chrome oxide and complex oxide of iron and chrome containing no precious metals are not capable of reducing CO sufficiently, and the copper-zinc catalyst has high initial activity, but the activity is reduced considerably if the operation is repeatedly started and stopped. Also, for the catalyst body with a precious metal carried on alumina, the activity is not reduced, but the concentration of methane at 400° C. is high. Also, if a complex oxide of Ce and Zr with Pt carried thereon is used, this is effective for the shift reaction, but the concentration of methane becomes slightly higher at a high temperature of about 400° C.

In this way, the hydrogen purification apparatus of the present invention has improved endurance of the CO shifting catalyst body, and can be operated even if the apparatus is started and stopped repeatedly.

EMBODIMENT 7

Figure 4:
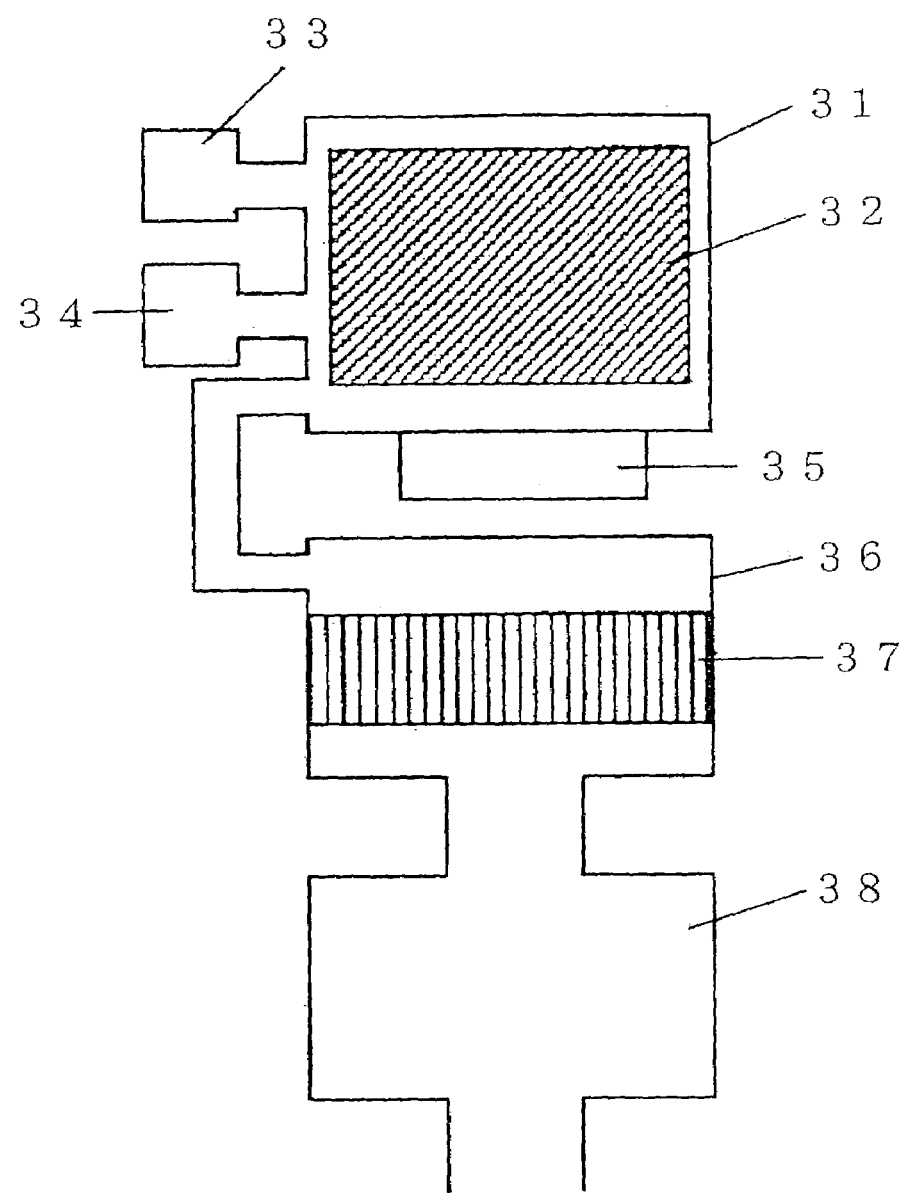
FIG. 4 is a schematic longitudinal sectional view showing the configuration of the hydrogen generator including the hydrogen purification apparatus according to Embodiment 7 of the present invention.

FIG. 4 is a block diagram of the hydrogen purification apparatus in Embodiment 7 of the present invention, and in this figure, a hydrogen gas supplying unit is constituted by a reforming unit 31, a reforming catalyst 32 contained in the reforming unit 31, a stock supplying unit 33 supplying a stock to the reforming catalyst 32, a water supplying unit 34 supplying water to the reforming catalyst 32 and a reform heating unit 35 heating the reforming catalyst 32, but detailed descriptions of these units are not presented here. Reference numeral 36 is a shifting unit to which a gas is supplied from the reforming unit 31, and a shifting catalyst body 37 is contained therein. The hydrogen gas with carbon monoxide reduced in the shifting unit 36 is passed through a purification unit 38 to further reduce the concentration of carbon monoxide to 100 ppm or smaller.

The apparatus operations in the above configuration will be described based on one example in which methane gas is used as a stock. During startup of the apparatus, heating of the reforming unit 31 by the reform heating unit 35 was started, and heat is transferred to the reforming catalyst 32. Subsequently, methane gas as a hydrocarbon component being a stock was supplied to the reforming catalyst 32 from the stock supplying unit 33, and 4 moles of water with respect to 1 mole of methane gas were supplied to the reforming catalyst 32 from the water supplying unit 34.

Furthermore, in this case, the steam reform reaction was carried out with methane being supplied at a rate of 350 L/hour, and the level of heating being controlled with the reform heating unit 35 so that the reforming catalyst 32 was kept at about 700° C. The hydrogen gas after the reaction in the reforming unit 31 was supplied to the shifting unit 36.

In the shifting unit 36, a shift reaction occurs by carbon monoxide in the hydrogen gas and steam on the shifting catalyst 37. The invention shown in this embodiment is characterized in that a catalyst prepared by having Pt carried on the oxide of iron (hereinafter referred to as Fe) is used as the shifting catalyst body 37. In this embodiment, the cogierite honeycomb is coated with this catalyst to form the shifting catalyst body 37.

For this catalyst, in the course of the shift reaction, the carbon atom of carbon monoxide is adsorbed to Pt to react with the water molecule to produce carbon dioxide, and is then detached from Pt, whereby the reaction proceeds. However, for precious metal based catalysts used in the past, in which oxides such as Al, Si, Ce and the like are used as carriers, there have been cases where the carbon atom of carbon monoxide is so strongly adsorbed to Pt that the carbon atom is hardly detached from Pt even though carbon dioxide is produced on Pt. Therefore, there have been cases where the absorption site on Pt is saturated to limit the rate of absorption of carbon monoxide. As a result, the case has been encountered where carbon monoxide not adsorbed to Pt in the hydrogen gas reacts with hydrogen to produce methane as a by-product.

Like the present invention, however, by using a Fe oxide as a carrier, methanation can be curbed to reduce carbon monoxide. As a reason for this, Fe acts to attract electrons of Pt, and therefore the absorption of the carbon atom of carbon monoxide to Pt occurring in the process of the shift reaction is weakened compared to the catalysts that have been traditionally used. Therefore, carbon dioxide produced through the reaction between carbon monoxide adsorbed to Pt and water is more easily detached, thus eliminating the possibility that the absorption of carbon monoxide onto Pt is limited. As a result, production of methane can be curbed.

In addition, with the Fe oxide constituted by $Fe_2O_3$ or/and $Fe_3O_4$, the shift reaction can be made to proceed preferentially, thus making it possible to curb production of methane as a by-product occurring due to the reaction between carbon monoxide and hydrogen. If the Fe oxide exists in the form of $Fe_2O_3$ in the hydrogen gas containing steam and carbon monoxide, the Fe oxide itself is reduced by carbon monoxide into $Fe_3O_4$ to produce carbon dioxide. $Fe_3O_4$ itself is oxidized by steam into $Fe_2O_3$ to produce hydrogen. In this way, the Fe oxide exists in the form of $Fe_2O_3$ or/and $Fe_3O_4$, and the Fe oxide itself repeatedly undergoes the oxidation-reduction cycle, whereby the shift reaction between carbon monoxide and hydrogen can be made to proceed preferentially. As a result, production of methane can be curbed.

Also, with the Fe oxide compounded with Cr or/and Ni, the endurance of the shifting catalyst body can be improved. Usually, the Fe oxide suffers thermal degradation if exposed to elevated temperatures, and thus its catalytic activity is reduced. However, since Cr or Ni has a capability of curbing the thermal degradation of Fe at elevated temperature, the catalytic activity can be retained even after exposure to elevated temperatures. Because Fe oxide particles are prevented from being coagulated by heat due to the presence of Cr or/and Ni oxides in the grain boundary of the Fe oxide, the thermal degradation of the shifting catalysis body can be curbed more effectively compared to the case where the Fe oxide exists by itself. In addition, if the Fe oxide and Cr or/and Ni oxides form a solid solution to become a complex oxide, migration, coagulation and growth of particles are reduced, and therefore the thermal degradation of the shifting catalyst body can be curbed further more effectively.

Also, by using a magnetic Fe oxide represented by ferrite, magnetite or the like, Pt is carried in high dispersion by the action of magnetism of Fe when Pt is carried on the Fe oxide, thereby making it possible to improve the catalytic activity. This is due to the fact that the reacting surface area is increased because Pt is highly dispersed.

Also, the particle size of Fe oxide affects the reactivity. The particle size of Pt in this catalyst is about 1 to 10 nm, and it is desirable that the particle size of a carrier for carrying Pt is larger than that of Pt. Also, if the particle size is smaller than 10 nm, coagulation tends to occur to cause thermal degradation of the shifting catalyst body. Also, if the particle size of Fe oxide is larger than 1 μm, the surface area decreases, and the force of interaction between the Fe oxide and Pt is reduced, and it is therefore desirable that the particle size of Fe oxide is smaller than 1 μm in order to allow the shift reaction to proceed effectively. In this connection, the particle size of Fe oxide in this embodiment is 30 nm.

Also, for the shifting catalyst body 37, high catalytic activity can be obtained by using a catalyst prepared by using zeolite as a catalyst carrier, and having Fe carried thereon by ion exchange, and having Pt carried thereon by the impregnation method.

Zeolite has a large surface area, and therefore increases the catalyst reaction area to improve the catalytic activity. Also, the ion exchange method as a carrying method only displaces acid spots in zeolite, and therefore enables Fe to be carried in high dispersion, leading to improvement of catalytic activity. Also, Fe carried by displacing acid spots in zeolite is an acidic substance having acid spots, and tends to attract the electrons of other substances. Therefore, because the electrons of subsequently carried Pt are attracted to Fe, adsorption of the carbon atom of carbon monoxide to Pt is weakened in the process of the shift reaction. As a result, the methanation reaction is curbed to allow the shift reaction to proceed selectively, thus making it possible to reduce carbon monoxide effectively as in the case of Pt carried on the Fe oxide.

Furthermore, by having Cu and Zn carried in place of Fe, an effect similar to that of Fe can be obtained. This is because Cu and Zn can easily be carried on zeolite by ion exchange, and is capable of attracting electrons in subsequently carried Pt, as in the case of Fe.

Furthermore, by using other precious metals, Pd, Ru and Rh in place of Pt, a similar effect can be obtained.

Furthermore, by using oxides of Al, Si, Ce, Zr and Ti in place of zeolite, a similar effect can be obtained. These oxides allow the surface area to be increased easily, and are capable of being used as carriers on which Fe and Pt can easily be carried, and therefore a similar effect can be obtained.

That is, a hydrogen purification apparatus comprising a gas supplying unit supplying at least steam and a hydrogen gas containing carbon monoxide, and shifting unit having a shifting catalytic body making carbon monoxide in the hydrogen gas and steam undergo a shift reaction, the shifting catalyst body may have at least one transition metal of Cu, Zn and Fe and at least one precious metal of Pt, Pd, Rh and Ru carried on a catalyst carrier, with the catalyst carrier being an oxide containing at least one element of Al, Si, Ce, Zr and Ti, and in this case, an effect similar to that described above can be obtained.

Also, the catalyst carrier may be zeolite, and in this case, a similar effect can be obtained.

Also, the shifting catalyst body may have at least one precious metal of Pt, Pd, Rh and Ru carried thereon after having at least one transition metal of Cu, Zn and Fe carried on the zeolite by ion exchange, and in this case, an effect similar to that described above can be obtained.

The configuration of a fuel cell power generation system using a carbon monoxide shifting and removing catalyst of the present invention, shown in FIG. 5, will now be described. A reforming unit 41 has a heating unit 42 therebelow, and the heating unit 42 is connected to a combustion gas supplying unit 49 through a pipe. Also, a stock supplying unit 43 and reform water supplying unit 44 are connected to the reforming unit 41. The reforming unit 41 is connected to a CO shifting unit 45, the CO shifting unit 45 is connected to a CO purification unit 47 through a pipe. The CO shifting catalyst of the present invention is placed inside the CO shifting unit 45. A purified air supplying unit 46 is connected to the pipe connecting the CO shifting unit 45 to the CO purification unit 47. The inlet of a fuel cell power generation unit 48 is connected to the CO purification unit 47 through a pipe. The combustion gas supplying unit 49 is connected to the outlet of the fuel cell power generation unit 48 through a pipe.

The operations of the fuel cell power generation system of the present invention shown in FIG. 5 will now be described.

The combustion gas supplied from the combustion gas supplying unit 49 is burned by the heating unit 42, thereby heating the reforming unit 41. Water is supplied to the reforming unit 41 from the reform water supplying unit 44, and this water is heated by the heating unit 42 to generate steam. The generated steam and the stock gas supplied from the stock supplying unit 43 are heated by the heating unit, whereby a reformed gas is produced. The produced reformed gas was passed to the CO shifting unit 45, and carbon monoxide contained in the reformed gas was reduced by the shift reaction. The reformed gas having reduced carbon monoxide was passed to the CO purification unit 47, and was oxidized by air supplied from the purified air supplying unit 46, whereby carbon monoxide is further reduced. The reformed gas exiting from the CO purification unit 47 is passed to the fuel cell power generation unit 48, where a power generation reaction occurs to draw out electricity. The reformed gas remaining without contributing to the power generation reaction in the fuel cell 48 is discharged from the outlet of the fuel cell 48, is passed to the combustion gas supplying unit 49 through a pipe, and is passed to the heating unit 42 along with the combustion gas.

Figure 5:
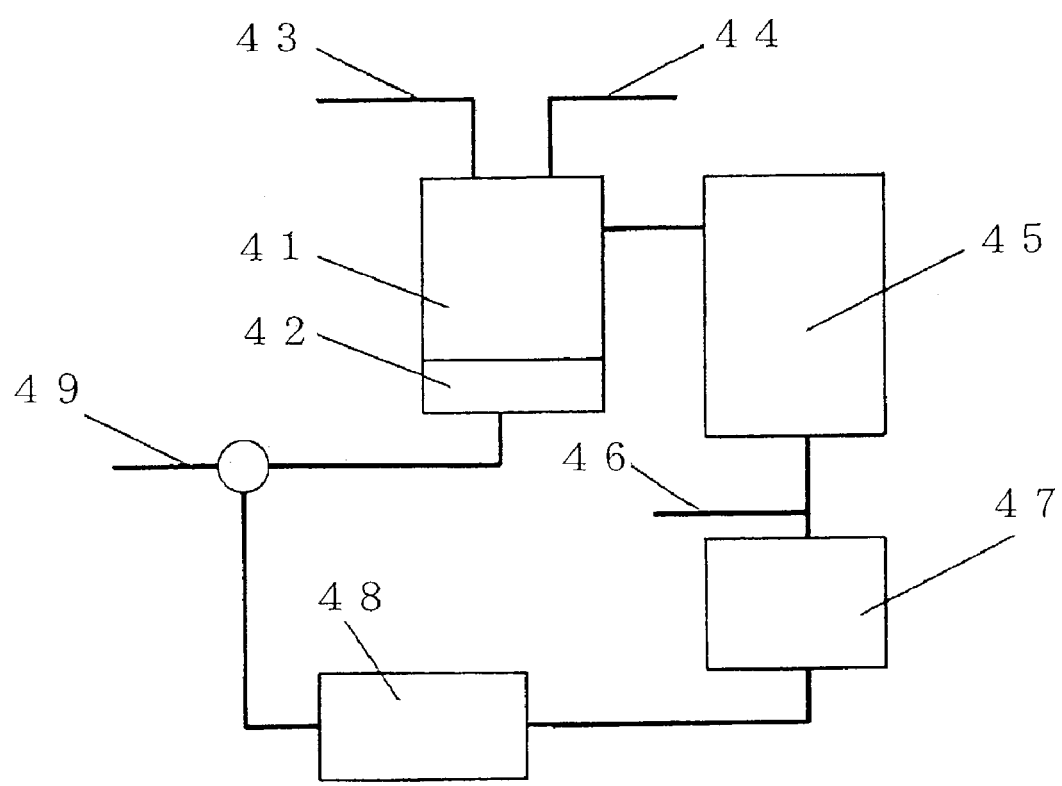
FIG. 5 is a schematic diagram showing the configuration of a fuel cell power generation system with the hydrogen purification apparatus of the present invention incorporated therein.

The carbon monoxide shifting unit incorporated in the fuel cell power generation system of the present invention shown in FIG. 5 has improved endurance of the CO shifting catalyst, and therefore can be operated stably even if the apparatus is started and stopped repeatedly, thus making it possible to reduce efficiently the concentration of CO over an extended time period (as described previously). Therefore, CO that will hinder the electrochemical reaction between hydrogen and oxygen in the fuel cell is removed stably by the CO purification unit, thus making it possible to achieve a fuel cell power generation system effective for domestic use, the power source of automobiles.

Examples 10 to 15 will now be described below as the Example corresponding to Embodiment 7.

EXAMPLE 10

2% by weight of precious metal (the type of precious metal is described in Table) was carried on the Fe oxide. Thereafter, this was shaped into slurry, and was coated to the cogierite honeycomb, which was placed in the shifting unit 36 as the shifting catalyst body 37 shown in FIG. 4.

The steam reform reaction was carried out with methane gas being supplied from the stock supplying unit 33 at a rate of 350 L/hour, and water being supplied from the water supplying unit 34 at a rate of 1400 L/hour, and the level of heating being controlled by the reform heating unit 35 so that the reforming catalyst 32 was kept at 750° C. As a result, the methane conversion ratio reached 100%, and the gas supplied to the shifting unit 36 had a composition of roughly 8% by volume of carbon monoxide, 8% by volume of carbon dioxide, 20% by volume of steam and 64% by volume of hydrogen. After the gas having the composition was reacted with the shifting catalyst body 37, the composition of the gas discharged to the outlet of the shifting unit 36 was measured by gas chromatography.

The minimum concentration of carbon monoxide measured with the temperature of the shifting catalyst body 37 being varied, and the concentration of methane measured with the temperature of the shifting catalyst body 37 being equal to 400° C. were determined. The results for Samples 1 to 5 are shown in Table 10.

TABLE 10

| Sample No. | Sample | Concentration of CO (%) | Concentration of Methane at 400° C. (%) |
| --- | --- | --- | --- |
| 1 | Pt/Iron Oxide | 0.70 | 0.01 |
| 2 | Ru/Iron Oxide | 0.78 | 0.50 |
| 3 | Pd/Iron Oxide | 0.95 | 0.05 |
| 4 | Rh/Iron Oxide | 0.90 | 0.10 |
| 5 | Pt/Alumina | 0.76 | 1.02 |

The experimental results shown in Table 10 support the aforesaid fact as described below. By having Pt carried on the Fe oxide, methanation is curbed more effectively compared to the conventional Pt/alumina catalyst, and carbon monoxide can be reduced reliably.

Also, if Ru is used in place of Pt, methanation more or less occurs, and if Pd and Rh are used, the concentration of carbon monoxide increases to some extent.

EXAMPLE 11

Precipitates formed by mixing Cr or/and Ni nitride with Fe nitride were baked to prepare complex oxides (the ratio is described in Table). 2% by weight of Pt was carried on the prepared complex oxide, and this was shaped into slurry, and was coated to the cogierite honeycomb, which was placed in the shifting unit 36 as the shifting catalyst body 37 shown in FIG. 4.

Operations were carried out in the same way as Example 10, and the gas composition at the outlet of the shifting unit 36 was measured as the initial property of the shifting catalyst body 37, with the temperature of the shifting catalyst body 37 being varied. Thereafter, the shifting catalyst body 37 was heated to 500° C. and then cooled, followed by carrying out a similar operation again to measure the composition of the gas at the outlet of the shifting unit 36. The minimum concentration of carbon monoxide obtained by varying the temperature of the shifting catalyst body 37 during measurement of the initial property, and the minimum concentration of carbon monoxide obtained by varying the temperature of the shifting catalyst body 37 after treating the shifting catalyst body 37 at 500° C. are shown in Table 11.

TABLE 11

| Sample No. | Complex Oxide | Initial Concentration of CO (%) | Concentration of CO (%) after Treatment at 500° C. |
| --- | --- | --- | --- |
| 1 | FeOx | 0.70 | 1.45 |
| 2 | Fe0.5Cr0.5Ox | 1.15 | 1.16 |
| 3 | Fe0.9Cr0.1Ox | 0.80 | 0.81 |
| 4 | Fe0.9Ni0.1Ox | 0.75 | 0.83 |
| 5 | Fe0.8Cr0.1Ni0.1Ox | 0.77 | 0.79 |

The experimental results shown in Table 11 support the aforesaid fact as described below. By using a complex oxide prepared by mixing Cr or/and Ni oxides with the Fe oxide, the initial activity of the catalyst body is reduced to a level slightly lower compared to the case where the Fe oxide is used alone, but the activity after the temperature of the catalyst body is increased to 500° C. is higher. When the Fe oxide is used alone, the catalysis body is thermally degraded to cause reduction in activity by exposure to elevated temperatures, but by using a complex oxide prepared by mixing a Cr or Ni oxide with the Fe oxide, thermal degradation of the shifting catalyst body 37 is prevented.

EXAMPLE 12

2% by weight of Pt was carried on each of Fe oxides having different particle sizes (the particle sizes are described in Table), and they were shaped into slurry, and were coated to cogierite honeycombs, which were placed in the shifting unit 36 as the shifting catalyst body 37 shown in FIG. 4.

Operations were carried out in the same way as Example 10, and the minimum concentration of carbon monoxide measured with the temperature of the shifting catalyst body 37 being varied, and the concentration of methane measured with the temperature of the shifting catalyst body 37 being equal to 400° C. were determined. The results for Samples 1 to 6 are shown in Table 12. The particle size in this embodiment is the average particle size.

TABLE 12

| Sample No. | Particle Size of Fe Oxide | Concentration of CO (%) |
| --- | --- | --- |
| 1 | 7 nm | 2.25 |
| 2 | 10 nm | 1.12 |
| 3 | 30 nm | 0.70 |
| 4 | 150 nm | 0.72 |
| 5 | 1 μm | 0.85 |
| 6 | 2 μm | 1.61 |

The experimental results shown in Table 12 support the aforesaid fact as described below. The concentrations of CO for the sample with the particle size of Fe oxide being 7 nm and the sample with the particle size of Fe oxide being 2 μm were higher than those for other samples. The particle size of Fe oxide is preferably 10 nm to 1 μm, further preferably 30 nm to 1 μm.

EXAMPLE 13

2% by weight of Pt was carried on each of Fe oxides having different oxidation states (the oxidation states are described in Table), and thereafter they were shaped into slurry, and were coated to cogierite honeycombs, which were placed in the shifting unit 36 as the shifting catalyst body 37 shown in FIG. 4.

Operations were carried out in the same way as Example 1, and the minimum concentration of carbon monoxide measured with the temperature of the shifting catalyst body 37 being varied, and the concentration of methane measured with the temperature of the shifting catalyst body 37 being equal to 400° C. were determined. The results for Samples 1 to 3 are shown in Table 13.

| Sample No. | Sample | Concentration of CO (%) | Concentration of Methane at 400° C. (%) |
| --- | --- | --- | --- |
| 1 | Pt/FeO | 2.60 | 0.50 |
| 2 | Pt/Fe2O3 | 0.70 | 0.01 |
| 3 | Fe3O4 | 0.71 | 0.01 |

The experimental results shown in Table 13 support the aforesaid fact as described below. The concentration of sample having FeO as the oxidation state of Fe oxide was larger than the concentrations of CO for other samples. $Fe_3O_4$ is desirable as the oxidation state of Fe oxide.

EXAMPLE 14

2% by weight of Pt was carried on each of Fe oxides having different magnetic states (the magnetic states are described in Table). For Samples 1 to 3, the particle size of Pt was measured by the amount of adsorbed CO per gram of sample. The results are shown in Table 14.

TABLE 14

| Sample No. | Catalyst Carrier | Magnetic State | Particle Size of Pt (nm) |
|---|---|---|---|
| 1 | Fe2O3 α type | Paramagnetic | 5.5 |
| 2 | Fe2O3 γ type | Ferromagnetic | 3.5 |
| 3 | Pt/Fe3O4 | Ferromagnetic | 0.9 |

The experimental results shown in Table 14 support the aforesaid fact as described below. The particle size of Pt for the sample with its Fe oxide in ferromagnetic state (having magnetism) was smaller than the particle sizes of Pt for other samples (Pt was carried in high dispersion). It is desirable that the Fe oxide is in ferromagnetic state.

EXAMPLE 15

2% by weight of transition metals (Fe, Cu, Zn) were each carried on zeolite or carriers of oxides of Al, Ce and Ti, and 2% by weight of precious metals (the type of precious metal is described in Table) was carried thereon, and thereafter they were shaped into slurry, and were coated to cogierite honeycombs, which were placed in the shifting unit 36 as the shifting catalyst body 37 shown in FIG. 4. As in the case of Example 10, the minimum value of carbon dioxide measured with the temperature of the shifting catalyst body 37 being varied, and the concentration of methane with the temperature of the shifting catalyst body 37 being 400° C. are shown in Table 15. Operations were carried out in the same way as Example 10.

TABLE 15

| Sample No. | Sample | Concentration of CO (%) | Concentration of Methane at 400° C. (%) |
|---|---|---|---|
| 1 | Pt/Fe/Zeolite | 0.60 | 0.01 |
| 2 | Pt/Cu/Zeolite | 0.70 | 0.06 |
| 3 | Pt/Zn/Zeolite | 0.75 | 0.20 |
| 4 | Pt/Fe/Al2O3 | 0.73 | 0.01 |
| 5 | Pt/Fe/CeO2 | 0.70 | 0.05 |
| 6 | Ru/Fe/Zeolite | 0.73 | 0.60 |
| 7 | Pd/Fe/Zeolite | 0.91 | 0.12 |
| 8 | Rh/Fe/Zeolite | 0.87 | 0.23 |
| 9 | Pt/Fe/TiO2 | 0.90 | 0.03 |
| 10 | Pt/Cu/Al2O3 | 0.75 | 0.03 |

The experimental results shown in Table 15 support the aforesaid fact as described below. It can be understood that by having Fe carried on zeolite by ion exchange, and having Pt carried thereon, the activity for the shift reaction can extremely improved, and methanation can be curbed. Catalysts with Cu and Zn ion-exchanged are also capable of curbing methanation, although not as effectively as Fe. It is apparent that Fe weakens adsorption of the carbon atom of carbon monoxide to Pt to initiate the shift reaction selectively.

As apparent from the above description, the present invention can provide a hydrogen purification apparatus enabling heating during startup and the like to be carried out smoothly, and having high CO purification efficiency, for example.

Also, the present invention can provide a hydrogen purification apparatus enabling heating during startup and the like to be carried out smoothly, and preventing methanation to improve efficiency of the apparatus, for example.

The invention claimed is:

1. A hydrogen generator comprising:
   a reformed gas inlet for introducing a stream of reformed gas, the reformed gas comprising hydrogen, carbon monoxide, and steam;
   a shifting unit for reducing the concentration of carbon monoxide in the reformed gas, the shifting unit comprising a carbon monoxide catalyst body for removing carbon monoxide with a shifting reaction, and
   a reformed gas outlet for discharging the reformed gas from said shifting unit:
   wherein:
   said carbon monoxide shifting catalyst body comprises at least one noble metal selected from the group consisting of Pt, Pd, Rh and Ru;
   said noble metal is supported on a carrier comprising a complex oxide of Zr compounded with at least one element selected from the group consisting of Mo, W, and Re;
   the atomic ratio of the total amount of Mo, W, and Re to the total amount of Mo, W, Re, and Zr in the complex oxide is 0.01 to 0.90; and
   said complex oxide is a solid solution.

2. The hydrogen generator according to claim 1, wherein the atomic ratio of the total amount of Mo, W, and Re to the total amount of Mo, W, Re, and Zr the complex oxide is larger than the atomic ratio of the total amount of Pt, Pd, Rh, and Ru to the total amount of Mo, W, Re, and Zr in the complex oxide.

3. The hydrogen generator according to claim 1 or claim 2, wherein:
   said carbon monoxide shifting catalyst body comprises a plurality of stages that are arranged one after another from upstream to downstream of the route of said reformed gas stream, and
   the hydrogen generator additionally comprises a heat releasing unit to release heat of said reformed gas, a cooling unit to cool said reformed gas, or both a heat releasing unit and a cooling unit between each of said plurality of stages.

* * * * *